(12) United States Patent
Yoshie et al.

(10) Patent No.: US 9,059,443 B2
(45) Date of Patent: Jun. 16, 2015

(54) FUEL CELL, FUEL CELL SYSTEM AND ELECTRONIC DEVICE

(75) Inventors: Tomohisa Yoshie, Nara (JP); Norihiro Ochi, Sakurai (JP); Kohtaroh Saitoh, Tenri (JP); Hironori Kanbara, Osaka (JP); Yasuyoshi Gotoh, Yao (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1452 days.

(21) Appl. No.: 11/806,663

(22) Filed: Jun. 1, 2007

(65) Prior Publication Data

US 2008/0107949 A1    May 8, 2008

(30) Foreign Application Priority Data

Jun. 6, 2006  (JP) .................. 2006-157511
Mar. 1, 2007  (JP) .................. 2007-051642

(51) Int. Cl.
*H01M 8/02* (2006.01)
*H01M 8/10* (2006.01)
*H01M 8/04* (2006.01)

(52) U.S. Cl.
CPC ........ *H01M 8/1011* (2013.01); *H01M 8/04201* (2013.01); *Y02E 60/523* (2013.01)

(58) Field of Classification Search
CPC ................... H01M 8/1009; H01M 8/1025
USPC ................... 429/447, 462, 493, 506, 515
See application file for complete search history.

(56) References Cited

U.S. PATENT DOCUMENTS

| | | | |
|---|---|---|---|
| 4,457,822 A | 7/1984 | Asano et al. | |
| 4,498,942 A | 2/1985 | Asano et al. | |
| 4,664,987 A | 5/1987 | Isenberg | |
| 4,752,370 A | 6/1988 | McMichael et al. | |
| 4,877,694 A | 10/1989 | Solomon et al. | |
| 5,252,409 A | 10/1993 | Akagi | |
| 5,364,711 A | 11/1994 | Yamada et al. | |

(Continued)

FOREIGN PATENT DOCUMENTS

| | | |
|---|---|---|
| JP | 60-258863 | 12/1985 |
| JP | 61-121268 | 6/1986 |

(Continued)

OTHER PUBLICATIONS

Hirabayashi et al. JP 2004-206885 (machine translation) Jul. 22, 2004.*

(Continued)

*Primary Examiner* — Tracy Dove
(74) *Attorney, Agent, or Firm* — Nixon & Vanderhye P.C.

(57) ABSTRACT

There are provided a fuel cell having stable and good power generation characteristics and good safety, a fuel cell system including the fuel cell and an electronic device equipped with the fuel cell. The fuel cell includes at least an electrolyte membrane, an anode formed on one surface of the electrolyte membrane, a cathode formed on the other surface of the electrolyte membrane, a liquid fuel chamber for supplying a liquid fuel to the anode, and a separating layer formed between the anode and the liquid fuel chamber. The separating layer and/or the anode has an exhaust passage that is continuously formed in an in-plane direction to discharge exhaust gas generated at the anode. The separating layer allows the liquid fuel to pass from the liquid fuel chamber to the anode and blocks the movement of gas from the anode to the liquid fuel chamber.

13 Claims, 25 Drawing Sheets

(56) References Cited

U.S. PATENT DOCUMENTS

| | | | |
|---|---|---|---|
| 5,399,184 A | 3/1995 | Harada | |
| 5,399,438 A | 3/1995 | Tateishi et al. | |
| 5,432,023 A | 7/1995 | Yamada et al. | |
| 5,549,982 A | 8/1996 | Akagi | |
| 6,054,228 A | 4/2000 | Cisar et al. | |
| 6,127,058 A | 10/2000 | Pratt et al. | |
| 6,743,541 B2 | 6/2004 | Chang et al. | |
| 6,766,817 B2 | 7/2004 | da Silva | |
| 6,918,404 B2 | 7/2005 | Dias da Silva | |
| 7,066,586 B2 | 6/2006 | da Silva | |
| 2002/0068213 A1 | 6/2002 | Kaiser | |
| 2002/0076597 A1 | 6/2002 | Chang et al. | |
| 2002/0114989 A1 | 8/2002 | Allen | 429/44 |
| 2003/0064265 A1 | 4/2003 | Hampden-Smith et al. | |
| 2003/0134172 A1 | 7/2003 | Grande et al. | |
| 2003/0180594 A1 | 9/2003 | Choi et al. | |
| 2003/0198849 A1 | 10/2003 | Hampden-Smith et al. | 429/30 |
| 2003/0198853 A1 | 10/2003 | Choi et al. | |
| 2004/0053100 A1 | 3/2004 | Stanley et al. | |
| 2004/0058224 A1 | 3/2004 | Eshraghi et al. | 429/40 |
| 2004/0058227 A1 | 3/2004 | Tanaka et al. | |
| 2004/0081878 A1 | 4/2004 | Mardilovich et al. | |
| 2004/0086776 A1 | 5/2004 | Muthuswamy et al. | |
| 2004/0229107 A1 | 11/2004 | Smedley | |
| 2004/0241526 A1 | 12/2004 | Ikeda | |
| 2005/0069736 A1 | 3/2005 | Oh et al. | 8/18 |
| 2006/0051655 A1 | 3/2006 | Yoshitake et al. | |
| 2007/0015037 A1 | 1/2007 | Cao | |
| 2007/0224481 A1 | 9/2007 | Suzuki et al. | |
| 2008/0014495 A1 | 1/2008 | Saito et al. | |
| 2008/0107949 A1 | 5/2008 | Yoshie et al. | |

FOREIGN PATENT DOCUMENTS

| | | | |
|---|---|---|---|
| JP | 05/014239 | 2/1993 | |
| JP | 05-144482 | 6/1993 | |
| JP | 05-325983 | 12/1993 | |
| JP | 06-020710 | 1/1994 | |
| JP | 06-188008 | 7/1994 | |
| JP | 7-70764 A | 3/1995 | |
| JP | 8-162141 | 9/1996 | |
| JP | 10-134829 | 5/1998 | |
| JP | 10-134836 | 5/1998 | |
| JP | 11-045729 | 2/1999 | |
| JP | 2000-106201 | 4/2000 | |
| JP | 2000-223136 | 8/2000 | |
| JP | 2001-102070 | 4/2001 | |
| JP | 2001-160406 | 6/2001 | |
| JP | 2001-283892 | 10/2001 | |
| JP | 2002-056855 | 2/2002 | |
| JP | 2002-175817 | 6/2002 | |
| JP | 2003-68325 A | 3/2003 | 8/2 |
| JP | 2003-187810 | 7/2003 | |
| JP | 2003-282131 | 10/2003 | |
| JP | 2003-331899 | 11/2003 | |
| JP | 2004-031026 | 1/2004 | |
| JP | 2004-178849 | 6/2004 | |
| JP | 2004-186116 A | 7/2004 | 8/2 |
| JP | 2004-192950 | 7/2004 | |
| JP | 2004-200064 | 7/2004 | |
| JP | 2004-206885 | 7/2004 | |
| JP | 2004-288400 | 10/2004 | |
| JP | 2005-032600 | 2/2005 | |
| JP | 2005-85764 A | 3/2005 | 8/2 |
| JP | 2005-93417 A | 4/2005 | 1/6 |
| JP | 2005-174872 | 6/2005 | |
| JP | 2005-517273 | 6/2005 | |
| JP | 2005-183014 A | 7/2005 | 8/4 |
| JP | 2005-235519 | 9/2005 | |
| JP | 2006-054082 | 2/2006 | |
| JP | 2006-507625 | 3/2006 | |
| JP | 2006-172944 | 6/2006 | |
| JP | 2006-222099 | 8/2006 | |
| JP | 2006-269126 | 10/2006 | |
| JP | 2007-265650 | 10/2007 | |
| WO | 03/067693 A2 | 8/2003 | |
| WO | 2004/093231 A2 | 10/2004 | |

OTHER PUBLICATIONS

International Search Report for PCT/JP2005/016717 mailed Dec. 13, 2005 (English and Japanese).
International Search Report for PCT/JP2008/063644 mailed Oct. 7, 2008 (English and Japanese).
Development and Application of Solid Polymer Electrolyte Fuel Cell, NTS Inc., p. 171 and partial translation.
Office Action mailed Dec. 2, 2009, for U.S. Appl. No. 11/661,801.
U.S. Appl. No. 12/671,878, Fujita, K. et al., filed Feb. 2, 2010.
U.S. Appl. No. 11/661,801, Saito et al., filed Mar. 1, 2007.
Office Action mailed May 24, 2010, for U.S. Appl. No. 11/661,801.
Office Action mailed Sep. 8, 2010, for U.S. Appl. No. 11/661,801.
Advisory Action in related U.S. Appl. No. 11/661,801; Notification Date of Sep. 14, 2012; 3 pgs.
Office Action in related U.S. Appl. No. 12/671,878; Notification Date of Aug. 16, 2013; 17 pages.
Office Action in related U.S. Appl. No. 12/671,878; Notification Date of Jan. 7, 2013; 30 Pgs.
Office Action issued in the related U.S. Appl. No. 12/671,878; Notification date Aug. 28, 2012 (7 pgs.).
Office Action mailed Jun. 8, 2010, for U.S. Appl. No. 11/661,801.
Office Action mailed Dec. 23, 2011, issued in U.S. Appl. No. 11/661,801.
Office Action in related U.S. Appl. No. 14/194,247; Notification Date Jun. 20, 2014; 14 pages.
Notice of Allowance mailed Dec. 20, 2013 in U.S. Appl. No. 12/671,878; 10 pages.
Office Action in related U.S. Appl. No. 14/194,247, dated Jan. 5, 2015; 16 pages.

* cited by examiner

FUEL CELL, FUEL CELL SYSTEM AND ELECTRONIC DEVICE

This nonprovisional application is based on Japanese Patent Applications Nos. 2006-157511 and 2007-051642 filed with the Japan Patent Office on Jun. 6, 2006 and Mar. 1, 2007, respectively, the entire contents of which are hereby incorporated by reference.

BACKGROUND OF THE INVENTION

1. Field of the Invention

The invention relates to a fuel cell having stable and good power generation characteristics and having good safety, a fuel cell system including the fuel cell and an electronic device equipped with the fuel cell.

2. Description of the Background Art

In recent years, expectations have been growing for fuel cells, because they can provide efficient power sources for portable electronic devices supporting information-oriented society and provide efficient stand-alone power generation devices. In a fuel cell, a fuel and oxygen from the air are electrochemically oxidized and reduced at an anode and a cathode, respectively, and electric power is generated through this reaction. Electrolyzers have also been investigated, which use the reverse reaction in which pure water is decomposed into hydrogen and oxygen through electrolysis.

Among a variety of fuel cells, a polymer electrolyte fuel cell (hereinafter also referred to as "PEFC") using a solid polymer ion-exchange membrane as an electrolyte has a thin electrolyte membrane and has a relatively low reaction temperature of 100° C. or less, which is lower than that of phosphoric acid or solid oxide fuel cells. Thus, it does not need large accessories so that it can achieve a small-sized fuel cell system.

Among polymer electrolyte fuel cells, a direct methanol fuel cell (hereinafter also referred to as "DMFC"), in which an aqueous methanol solution is supplied to an anode, while protons and electrons are directly taken out of the aqueous methanol solution to generate electric power, does not need a reformer and thus has the potential to achieve a practical compact power source. In the direct methanol fuel cell using a fuel of an aqueous methanol solution, which is liquid at room temperature under normal pressure, the fuel having a high volume energy density can be handled with a simple vessel and without a high-pressure gas cylinder. Thus, it can provide a highly-safe compact power source with a small fuel vessel. Therefore, attention is focused on it from the view point of its application to compact power sources for electronic devices such as portable electronic devices, particularly from the view point of its application to alternative secondary batteries for portable electronic devices. Fuel cells using a liquid fuel also have the potential of using a liquid fuel with higher volume energy density, higher flash point and excellent safety, such as ethanol and propanol, in the future.

In a fuel cell, a fuel and air are electrochemically oxidized and reduced at an anode and a cathode, respectively, to generate electric power. When a liquid fuel such as an aqueous methanol solution is supplied to the anode, the liquid fuel in contact with the anode is oxidized and separated into protons and gas such as carbon dioxide gas. For example, in the case of an aqueous methanol solution, carbon dioxide gas is generated on the anode side according to the reaction: $CH_3OH + H_2O \rightarrow CO_2\uparrow + 6H^+ + 6e^-$.

Protons are transferred to the cathode side through an electrolyte membrane. At the cathode, the protons and oxygen from the air react to produce water. In this process, electrons pass through an external load and move from the fuel cell to the cathode and are taken out as electric power.

Since fuel cells using a liquid fuel have the above-mentioned mechanism, the liquid fuel such as an aqueous methanol solution and exhaust gas generated at the anode, such as carbon dioxide gas, form a gas-liquid mixture state at the anode. Thus, it is necessary to provide a gas discharge hole for discharging the exhaust gas out of the fuel cell. In this case, however, there is a problem in which the liquid fuel such as an aqueous methanol solution can leak from the gas discharge hole.

Under the circumstances, there are disclosed techniques for discharging the exhaust gas from a gas-liquid mixture of a liquid fuel such as an aqueous methanol solution and exhaust gas such as carbon dioxide gas.

Japanese Patent Laying-Open No. 2000-106201 discloses a fuel cell including a fuel vaporizing layer and a fuel permeable layer that is stacked on the fuel vaporizing layer and supplies a supplied liquid fuel to the fuel vaporizing layer. In the fuel vaporizing layer, therefore, the gaseous fuel and carbon dioxide are mixed in a vapor phase so that the problem of the liquid fuel leakage can be solved.

However, the structure disclosed in Japanese Patent Laying-Open No. 2000-106201 has a problem in which if a high concentration fuel is used, the discharge of carbon dioxide to the outside of the fuel cell can be accompanied by the discharge of the high concentration gaseous fuel.

Japanese Patent Laying-Open No. 2005-032600 discloses a gas-liquid separation system including a gas-liquid separator that separate a gas-liquid two-layer flow into exhaust gas and a liquid, a carburetor that heats the gas-liquid two-layer flow to vaporize the liquid, a selecting valve that changes the direction of the gas-liquid two-layer flow, a liquid quantity sensor that measures the quantity of a liquid staying in the gas-liquid separator, and a controller that determines the direction of the gas-liquid two-layer flow from the selecting valve based on the liquid quantity measured by the liquid quantity sensor.

However, the configuration disclosed in Japanese Patent Laying-Open No. 2005-032600 still has a problem in which the system is complicated, and separation between the liquid fuel and exhaust gas generated at the anode is difficult.

Japanese Patent Laying-Open No. 2001-102070 discloses a fuel cell including a gas discharge hole that is formed in a fuel vessel or an introducing tube and provided with a separation membrane composed of a porous material having pores whose surface is water-repellant treated. A liquid fuel such as an aqueous methanol solution is supplied to the introducing tube and then supplied to an anode by the capillary phenomenon of a liquid fuel holding part. The fuel cell is configured such that carbon dioxide gas generated at the anode is discharged to the introducing tube through the liquid fuel holding part and discharged through the separation membrane provided on the gas discharge hole to the outside of the fuel cell.

However, the structure of Japanese Patent Laying-Open No. 2001-102070 causes a problem, for example, in a case where an aqueous methanol solution is charged into the introducing tube. Specifically, all the separation membranes provided on the introducing tube are immersed in the aqueous methanol solution and thus increase the internal pressure of the introducing tube without discharging carbon dioxide gas generated at the anode. Therefore, there is a problem in which the aqueous methanol solution can leak out of the fuel cell due to the increase in the internal pressure of the introducing tube, even if the surface of the pores in the porous separation membrane is water-repellent treated with a fluororesin.

There is also a problem in which when an aqueous methanol solution with a high concentration is supplied to the introducing tube, the aqueous methanol solution can infiltrate into the separation membrane because of a surface tension of methanol lower than that of water, so that the separation membrane cannot perform its own function, even if the surface of the pores in the porous separation membrane is water-repellent treated.

Japanese Patent Laying-Open No. 2003-331899 discloses a liquid fuel cell including a liquid fuel storing part provided with a gas-liquid separation hole having a gas-liquid separation membrane, in which the gas-liquid separation membrane is an oil-repellent treated porous fluororesin membrane or an oil-repellent treated laminate composite of a porous fluororesin membrane and another exhaust gas-permeable material. Japanese Patent Laying-Open No. 2003-331899 suggests that if the gas-liquid separation membrane is oil-repellent treated, leakage of a lipophilic liquid fuel such as methanol and ethanol can be prevented.

However, the method of Japanese Patent Laying-Open No. 2003-331899 has a problem in which even if the gas-liquid separation membrane is oil-repellent treated, an aqueous methanol solution with a high concentration in contact with the gas-liquid separation membrane can infiltrate into the membrane so that the function of the gas-liquid separation membrane can be easily degraded.

There is also a problem in which if operation for power generation is performed in an orientation where carbon dioxide less comes into contact with the gas-liquid separation membrane, for example, if the positive electrode is placed upward in the vertical direction, carbon dioxide generated at the negative electrode can increase the internal pressure of the liquid storing part until it comes into contact with the gas-liquid separation membrane so that the aqueous methanol solution can leak from the gas-liquid separation membrane to the outside of the fuel cell.

Japanese Patent Laying-Open No. 2002-175817 discloses a fuel cell including a plate provided with a channel for supplying a liquid fuel such as an aqueous methanol solution and a channel for discharging generated carbon dioxide gas and including a fuel permeable member that allows only a liquid to pass through to the liquid fuel supply channel and a diffusion layer. The fuel permeable member is placed so as to envelop the liquid fuel supply channel, and thus the fuel cell is configured such that generated carbon dioxide gas is not discharged to the liquid fuel supply channel but discharged from a carbon dioxide gas discharge channel to the outside of the fuel cell.

However, the structure disclosed in Japanese Patent Laying-Open No. 2002-175817 has a problem in which as disclosed in its specification, if a deviation is caused between the positions of the stacked liquid fuel supply channel and fuel permeable member by an insufficient location accuracy in fuel cell assembling or by shaking during transportation, carbon dioxide gas can be discharged to the liquid fuel supply channel, or the liquid fuel can leak to the gas discharge channel, so that separation between the aqueous methanol solution and carbon dioxide gas can be difficult.

In addition, if a pressure difference occurs in such a manner that the pressure for the liquid fuel supply to the channel exceeds the pressure for the discharge of carbon dioxide gas, the fuel permeable member can be dissociated from an anode catalyst layer and bent toward the liquid fuel supply channel side. Thus, there is a problem in which if the fuel permeable member is dissociated from the anode catalyst layer, carbon dioxide gas can stay at the interface between the fuel permeable member and the anode catalyst layer to inhibit the liquid fuel supply to the anode catalyst layer.

Japanese Patent Laying-Open No. 2005-235519 discloses a fuel cell structure including a polymer solid electrolyte membrane, anode and cathode electrodes integrally formed on both sides of the polymer solid electrolyte membrane, a fuel diffusion layer placed on the anode electrode side, an air diffusion layer placed on the cathode electrode side, an electrical power collector that is placed on each of the outer sides of the fuel diffusion layer and the air diffusion layer and collects electric energy generated between the anode and cathode electrodes, and a gas-liquid separation membrane placed on the anode electrode side. Japanese Patent Laying-Open No. 2005-235519 suggests that the gas-liquid separation membrane can well discharge carbon dioxide generated in a reaction chamber on the anode side so that the efficiency of the reaction between methanol and water can be improved.

Japanese National Patent Publication No. 2006-507625 discloses a bi-polar plate having two individual fuel cells, which includes: an anode portion in a first fuel cell, wherein the anode portion includes a fuel flow field, an exhaust gas permeable membrane positioned away from the anode aspect of a membrane electrolyte and a gaseous effluent vent channel that is positioned adjacent to the exhaust gas permeable membrane and communicates gaseous effluent from the anode aspect of the membrane electrolyte via an outlet; and a cathode portion in a second fuel cell having a flow field by which oxygen is introduced to the cathode portion of the fuel cell.

In the methods disclosed in Japanese Patent Laying-Open No. 2005-235519 and Japanese National Patent Publication No. 2006-507625, the fuel diffusion layer and the fuel flow field have a gas-liquid mixture state of carbon dioxide and the fuel so that carbon dioxide can be insufficiently discharged in the layer thickness direction by the gas-liquid separation membrane and the exhaust gas permeable membrane and thus can be mixed with the fuel to form a gas-liquid mixture flow and discharged out of the fuel cell. Thus, the fuel cell still has a problem in which the fuel can finally leak outside the fuel cell, when carbon dioxide is discharged with a liquid waste tank or the like. In addition, the fuel supply direction is contrary to the carbon dioxide discharge direction at the anode electrode so that the efficiency of the liquid fuel supply can be easily reduced.

Japanese Patent Laying-Open No. 2004-206885 discloses a fuel cell that includes a fuel chamber that is provided adjacent to an anode in order to suppress an excessive supply of a liquid fuel to the anode, wherein the fuel chamber contains the liquid fuel and a polymer material.

The technique of Japanese Patent Laying-Open No. 2004-206885 has a problem in which the exhaust hole for carbon dioxide generated by the reaction also serves as an injection hole for the liquid fuel, so that separation between exhaust gas generated at the anode and the liquid fuel is difficult, and also has another problem in which the liquid fuel supply efficiency can be easily reduced by the contamination of the liquid fuel with carbon dioxide, and when the liquid fuel is distributed to the whole, the structure for discharging carbon dioxide in the layer thickness direction of the fuel cell makes the liquid fuel travel a long distance, so that the pressure loss can be increased when the fuel is supplied.

SUMMARY OF THE INVENTION

It is an object of the invention to solve the above problems and to provide a fuel cell having stable and good power generation characteristics and having good safety, a fuel cell system including the fuel cell and an electronic device equipped with the fuel cell.

The invention is directed to a fuel cell including at least an electrolyte membrane, an anode formed on one surface of the electrolyte membrane, a cathode formed on another surface of the electrolyte membrane, a liquid fuel chamber for supplying a liquid fuel to the anode, and a separating layer formed between the anode and the liquid fuel chamber, wherein the separating layer and/or the anode has an exhaust passage that is continuously formed in an in-plane direction to discharge exhaust gas generated at the anode, and the separating layer allows the liquid fuel to pass from the liquid fuel chamber to the anode and blocks the movement of gas from the anode to the liquid fuel chamber.

In the fuel cell of the invention, the separating layer preferably allows the liquid fuel to pass through by permeation and diffusion.

In the fuel cell of the invention, the separating layer is preferably a porous layer.

In the fuel cell of the invention, the separating layer preferably has a hole passing through in its layer thickness direction.

In the fuel cell of the invention, the liquid fuel is preferably allowed to pass through the hole and then supplied to the anode, and the hole preferably forms a part of the exhaust passage.

In the fuel cell of the invention, the separating layer is preferably a solid polymer electrolyte membrane.

In the fuel cell of the invention, the solid polymer electrolyte membrane is preferably a hydrocarbon-based solid polymer electrolyte membrane.

In the fuel cell of the invention, the hydrocarbon-based solid polymer electrolyte membrane preferably includes at least one solid polymer electrolyte selected from the group consisting of sulfonated polyimide, sulfonated polyetheretherketone, sulfonated polyarylene ether, and sulfonated polystyrene.

In the fuel cell of the invention, only a hole preferably forms a passage for the liquid fuel in the separating layer.

In the fuel cell of the invention, the anode preferably includes at least an anode catalyst layer and an anode conductive layer, the separating layer is preferably formed in contact with the anode, and the anode conductive layer preferably has a continuous hole being continuous in its layer thickness direction.

In the fuel cell of the invention, irregularities are preferably formed on a surface of the anode conductive layer.

In the fuel cell of the invention, the anode conductive layer is preferably a porous metal layer.

In the fuel cell of the invention, the porous metal layer is preferably at least one selected from a metal mesh, a metal foam and a sintered metal material.

In the fuel cell of the invention, the anode catalyst layer and/or the anode conductive layer is preferably joined to the separating layer.

In the fuel cell of the invention, the anode preferably includes an anode catalyst layer, an anode conductive layer and a porous substrate, the cathode preferably includes a cathode catalyst layer and a cathode conductive layer, and the fuel cell preferably has a laminated structure in which the porous substrate, the anode conductive layer, the anode catalyst layer, the electrolyte membrane, the cathode catalyst layer, and the cathode conductive layer are joined in this order.

In the fuel cell of the invention, one end of the separating layer is preferably formed in contact with the outside of the fuel cell.

The invention is also directed to a fuel cell system, including: any of the above fuel cells incorporated therein; and a discharge chamber for the anode and a discharge chamber for the cathode, wherein the discharge chamber for the anode and the discharge chamber for the cathode each have an exhaust port for exhausting gas, at least the exhaust port of the discharge chamber for the anode has a filter function to remove a volatile organic substance, and the system is configured such that exhaust gas generated at the anode is discharged from the discharge chamber for the anode to outside through the exhaust port.

In the fuel cell system of the invention, the exhaust port of the discharge chamber for the anode preferably also serves as the exhaust port of the discharge chamber for the cathode.

The fuel cell system of the invention preferably further includes a fuel supply chamber for supplying the liquid fuel to the liquid fuel chamber, wherein the fuel supply chamber preferably has a pressure control mechanism for supplying the liquid fuel to the liquid fuel chamber under atmospheric pressure.

In the fuel cell system of the invention, a fuel reservoir having a hole only at a site communicating with the liquid fuel chamber is preferably placed in an interior of the fuel supply chamber, and the liquid fuel is preferably charged into an interior of the fuel reservoir.

The invention is also directed to an electronic device including any of the above fuel cells or any of the above fuel cell systems.

In the fuel cell of the invention, the exhaust gas generated at the anode is allowed to move in the in-plane direction through the exhaust passage of the separating layer and/or the anode and discharged out of the fuel cell. Therefore, even when a high concentration liquid fuel is supplied, the liquid fuel can be prevented from leaking, contamination of the liquid fuel with exhaust gas generated at the anode can also be prevented, and stable and good power generation characteristics and good safety can also be provided. According to the invention, the structure for discharging exhaust gas in the in-plane direction can prevent contamination of the liquid fuel supply route with the exhaust gas generated at the anode, even when a positional deviation occurs during fuel cell assembling or when shaking is caused by transportation, so that stable and good power generation characteristics and good safety can be provided. Fuel cell systems including the fuel cell of the invention have stable and good power generation characteristics and also have good safety. There are also provided electronic devices that are equipped with the above fuel cell and have stable and good power generation characteristics and good safety.

The fuel cell of the invention using a high concentration liquid fuel can have stable and good power generation characteristics and good safety, even when a positional deviation occurs during assembling or when shaking is caused by transportation. The fuel cell of the invention and the fuel cell system including the fuel cell are suitable for use in electronic devices, particularly portable electronic devices such as mobile devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
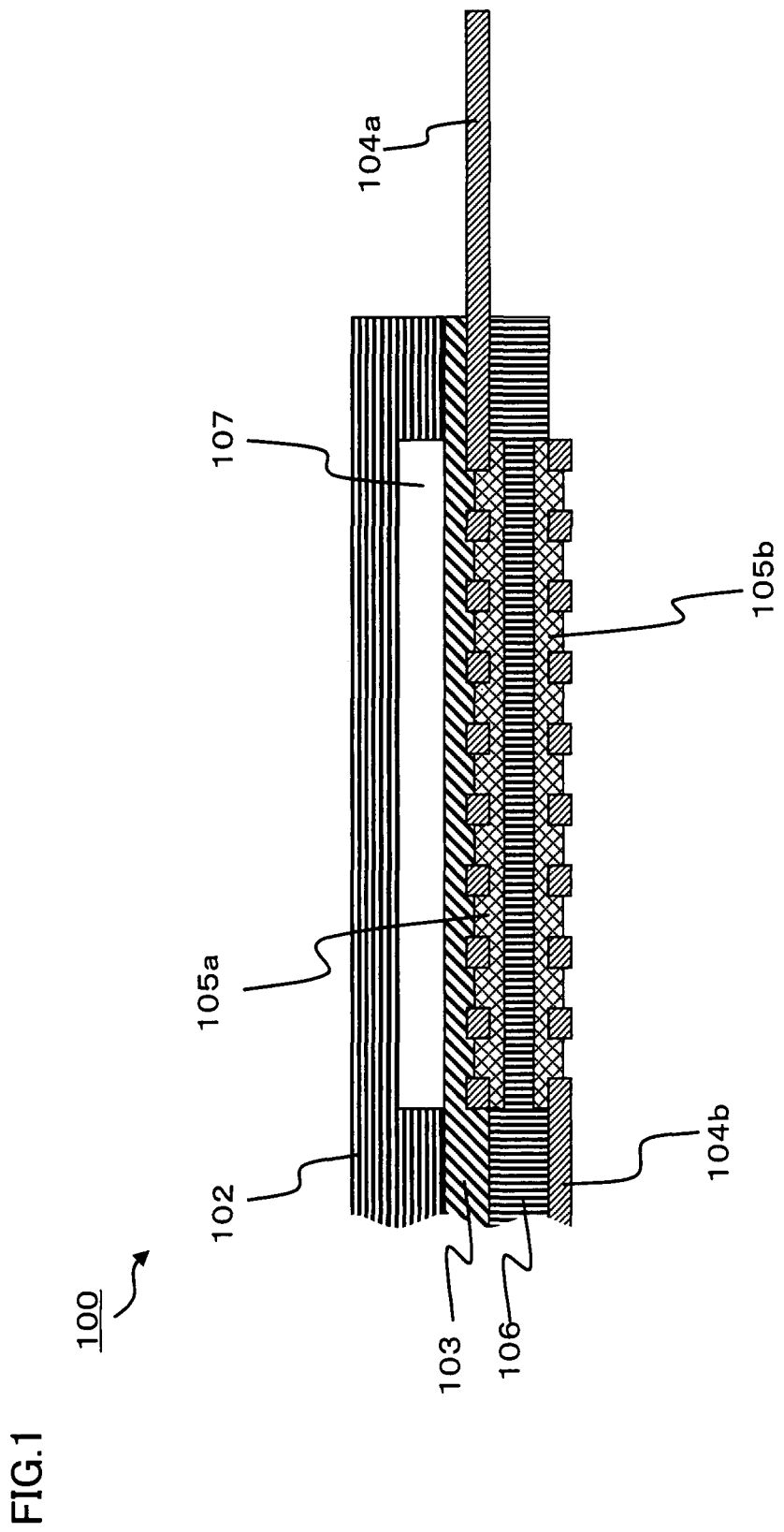
FIG. 1 is a cross-sectional view schematically showing a preferred structure of the fuel cell of the invention.

The fuel cell of the invention includes at least an electrolyte membrane, an anode formed on one surface of the electrolyte membrane, a cathode formed on the other surface of the electrolyte membrane, a liquid fuel chamber for supplying a liquid fuel to the anode, and a separating layer formed between the anode and the liquid fuel chamber. The separating layer and/or the anode has an exhaust passage that is continuously formed in an in-plane direction to discharge exhaust gas generated at the anode. The separating layer allows the liquid fuel to pass from the liquid fuel chamber to the anode and blocks the movement of gas from the anode to the liquid fuel chamber.

As used herein, the term "in-plane direction" means a direction perpendicular to the thickness direction of each layer constituting the fuel cell. According to the invention, the separating layer is provided to prevent exhaust gas from passing in the layer thickness direction, and the exhaust passage is continuously formed in the in-plane direction in the separating layer and/or the anode, so that the exhaust gas generated at the anode is allowed to move in the in-plane direction through the exhaust passage of the separating layer and/or the anode and discharged without intruding into the liquid fuel chamber. Thus, the degree of the growth of exhaust gas bubbles, which would otherwise become a cause of the inhibition of the liquid fuel supply, can be reduced, and liquid fuel leakage can be effectively prevented, which would otherwise be caused by elevation of internal pressure to make a problem when the exhaust gas intrudes into the liquid fuel chamber.

Since the fuel cell of the invention is also configured such that a liquid fuel is supplied to the anode through the separating layer, the amount of the supply of the liquid fuel to the anode can be controlled within the desired range by controlling the form and constituent material of the separating layer. Thus, even when a high concentration liquid fuel is supplied, the concentration of the liquid fuel infiltrated into the electrolyte of the anode catalyst layer can be kept low at a certain concentration or less, so that there can be provided the advantage that a reduction in power generation efficiency, namely the crossover phenomenon, which would otherwise be caused by the permeation of the liquid fuel through the electrolyte membrane, can be prevented, and a reduction in the power generation characteristics of the fuel cell can also be prevented.

In the fuel cell of the invention, the separating layer is formed so as to allow a liquid fuel to pass from the liquid fuel chamber to the anode and so as to block the movement of gas from the anode to the liquid fuel chamber. Thus, in the fuel cell, the liquid fuel supply route is separated from the route through which exhaust gas generated at the anode is discharged, so that the exhaust gas can be discharged without interfering with the liquid fuel supply. Therefore, there can be provided the advantage that the liquid fuel can be stably supplied to the anode catalyst layer and stable power generation characteristics of the fuel cell can be maintained.

Herein, the layer that allows a liquid fuel to pass from the liquid fuel chamber to the anode and blocks the movement of gas from the anode to the liquid fuel chamber means a layer that is configured such that the liquid fuel is allowed to pass through in the layer thickness direction preferentially to exhaust gas, because the layer is made of a material that easily allows the liquid fuel to pass through and hardly allows the exhaust gas to pass through or because the layer has an exhaust mechanism to prevent the permeation of the exhaust gas, or because of any other reason, and more typically means a layer that allows substantially only the liquid fuel to pass through, among the liquid fuel and the exhaust gas.

The structures of the fuel cell, fuel cell system and electronic device according to the invention are described below with reference to the drawings by illustrating direct methanol fuel cells, which are not intended to limit the scope of the invention. In the drawings referred to in the description below, parts with the same reference marks have the same function, and the description thereof is not repeated. The liquid fuel usable in the fuel cell of the invention preferably includes an organic fuel including hydrogen. The organic fuel may be in the form of a mixture with exhaust gas or in the form of a blended liquid fuel of different liquids. For example, the liquid fuel may be one or more selected from lower alcohols such as methanol and ethanol, DME (dimethyl ether), formaldehyde, methyl formate, formic acid, acetone, and toluene, or a mixture of two or more thereof.

Embodiment 1

Referring to FIG. 1, a fuel cell 100 includes an anode composed of an anode conductive layer 104a and an anode catalyst layer 105a, an electrolyte membrane 106, a cathode composed of a cathode catalyst layer 105b and a cathode conductive layer 104b, a separating layer 103 provided in contact with the anode, and a housing 102. Housing 102 is sealed with separating layer 103 to form a liquid fuel chamber 107. Anode catalyst layer 105a is typically composed of an electrolyte and an anode catalyst-supporting electrical conductor including anode catalyst particles supported by an anode conductor.

According to the invention, separating layer 103, which allows the liquid fuel to pass from the liquid fuel chamber to the anode and blocks the movement of gas from the anode to the liquid fuel chamber, selectively allows the liquid fuel to pass through in the thickness direction of the separating layer and hardly allows the exhaust gas generated at the anode to pass through. FIG. 1 shows a case where a membrane that allows the liquid fuel to permeate and diffuse therethrough (hereinafter simply referred to as "liquid permeable membrane") is provided as the separating layer. The separating layer formed of a liquid permeable membrane may also have the function of limiting the amount of permeation of the liquid fuel from the liquid fuel chamber to the anode catalyst layer. In this case, the liquid permeable membrane can control the rate of supply of the liquid fuel to the anode and inhibit the dissolution of the electrolyte, for example, even when a catalyst layer containing an electrolyte with very high proton conductivity is formed. A description is given below of cases where porous layers with the structure described later are provided to form anode catalyst layer 105a and anode conductive layer 104a, which are not intended to limit the scope of the invention.

Referring to FIG. 1, when a liquid fuel is charged into liquid fuel chamber 107 on the anode side, the liquid fuel penetrates into separating layer 103 and passes through separating layer 103 to be supplied to anode catalyst layer 105a. The liquid fuel causes oxidation at anode catalyst layer 105a to be decomposed into electrons, protons and carbon dioxide gas (exhaust gas). In FIG. 1, anode conductive layer 104a is made of a porous layer as described later so that continuous pores (not shown) are formed in the in-plane direction at the interface between separating layer 103 and anode conductive layer 104a to serve as the exhaust passage according to the invention.

Carbon dioxide gas, which is exhaust gas, passes through the pores of the porous anode catalyst layer 105a in the layer thickness direction, reaches the interface between separating layer 103 and anode conductive layer 104a, and moves in the in-plane direction through the pores continuously formed in the in-plane direction at the interface, so that it is discharged out of fuel cell 100.

In the invention, anode conductive layer 104a preferably has continuous pores in the layer thickness direction and in the in-plane direction. In this case, not only the pores at the interface between anode conductive layer 104a and separating layer 103 but also the pores in the interior of anode conductive layer 104 serve as the exhaust passage according to the invention so that the efficiency of the exhaust gas discharge can be further improved.

The exhaust gas discharged from the anode of the fuel cell generally contains liquid fuel vapors. However, the exhaust gas is discharged while being in contact with the electrolyte of anode catalyst layer 105a, so that the concentration of the liquid fuel vapor in the exhaust gas generated at the anode and discharged can be controlled to be lower than that in the case that exhaust gas is discharged through a liquid fuel, even when a high concentration liquid fuel is used.

Each element of fuel cell 100 according to the invention is described below. Housing 102 functions as a fuel vessel. Liquid fuel chamber 107 is formed between housing 102 and separating layer 103 to hold a liquid fuel.

The fuel cell of the invention is preferably configured such that the liquid fuel is allowed to pass from liquid fuel chamber 107 through the separating layer in the layer thickness direction and thus supplied to the anode, while the exhaust gas generated at the anode hardly returns to liquid fuel chamber 107. Specifically, it is preferred that the liquid fuel chamber should be substantially hermetically sealed except for openings for fuel supply and pressure control. In this case, there can be provided a fuel cell that is prevented from causing leakage and has more stable and good power generation characteristics regardless of its orientation during operation.

Any material that is insoluble in the liquid fuel and does not allow the liquid fuel or its vapor to pass therethrough may be used for housing 102 that forms liquid fuel chamber 107 in the fuel cell of the invention. When a lower alcohol such as methanol is used as the liquid fuel, for example, it is preferred to use a plastic material such as acrylic, polyimide, polyethylene terephthalate, polyethylene, polyarylate, polyetheretherketone, polyetherimide, polyamideimide, polyethersulfone, polyphenylene oxide, polytetrafluoroethylene, and polyvinylidene fluoride. When an organic solvent with high solubility for plastics, such as acetone and toluene, is used as the liquid fuel, it is preferred to use a metal material such as titanium, stainless steel and aluminum.

In the invention, separating layer 103 is formed between the anode and liquid fuel chamber 107. In the invention, anode catalyst layer 105a and/or anode conductive layer 104a is preferably joined to separating layer 103. If separating layer 103 is joined to anode catalyst layer 105a, peeling between separating layer 103 and anode catalyst layer 105a can be prevented so that the liquid fuel can be stably supplied to anode catalyst layer 105a even when the pressure for discharging the exhaust gas generated at the anode is higher than the liquid fuel supply pressure. If separating layer 103 is also jointed to anode conductive layer 104a, peeling between separating layer 103 and anode catalyst layer 105a can be well prevented.

In particular, when separating layer 103 is jointed to anode catalyst layer 105a, separating layer 103 is preferably in contact with the electrolyte in the interior of anode catalyst layer 105a as described later.

Separating layer 103 may be joined to anode catalyst layer 105a and/or anode conductive layer 104a by such a method as fusion bonding. A polymer binder or the like in anode catalyst layer 105a or anode conductive layer 104a may be deformed by heat in a hot pressing process so that the junction can be ensured by a three-dimensional anchor effect. In this case, the electrical contact between separating layer 103, anode catalyst layer 105a and anode conductive layer 104a can be favorably maintained without application of external pressure by fastening with a bolt, a nut and the like. The external pressure-free method is also advantageous because it can hardly cause variations in in-plane pressure and impart stable power generation characteristic. In order to apply the external pressure, some portions are pressed such that a pressure can be applied to the areas of anode catalyst layer 105a and cathode catalyst layer 105b, so that the supply of the fuel or air can be hindered. Therefore, the method without the application of the external pressure is also advantageous, because it does not inhibit the supply of the fuel or air and particularly because it allows a sufficient air supply.

The structure including separating layer 103, anode conductive layer 104a, and anode catalyst layer 105a stacked in this order as shown in FIG. 1 is preferably configured such that continuous pores are formed so as to allow the liquid fuel to pass through in the thickness direction of anode conductive layer 104a and that the separating layer is formed in contact with the anode. In this case, anode catalyst layer 105a may be exposed from the continuous pores, and separating layers 103 may be formed, respectively, at all the exposed portions. In this case, the junction between separating layers 103 and anode catalyst layer 105a can further improve the efficiency of the liquid fuel supply.

In fuel cell 100 of the invention, as the liquid fuel is consumed, the internal pressure of liquid fuel chamber 107 becomes lower than atmospheric pressure. However, a material that has specific stiffness so as not to be deformed by the internal pressure reduction may be used to form housing 102. In such a case, at least one gas pressure control hole (not shown) is preferably formed in housing 102. Additionally, a gas-liquid separation membrane such as Gore-Tex is more preferably provided for the gas pressure control hole. The gas pressure control hole functions to take in air from the outside when the internal pressure of liquid fuel chamber 107 becomes lower than atmospheric pressure as the liquid fuel is consumed.

Housing 102 may have any structure, as long as it can form liquid fuel chamber 107 with separating layer 103. Examples of available structures include a structure having a recess formed as liquid fuel chamber 107 by cutting in a plastic plate and a structure having liquid fuel chamber 7 formed by press working of a metal plate. The peripheral portion of a flexible plastic membrane or metal foil may be joined to the peripheral portion of separating layer 103 so that a space between the unjoined portion of the plastic membrane or metal foil and separating layer 103 can form liquid fuel chamber 107, and such a structure is more preferably used. In such a flexible structure, housing 102 is deformed to reduce the volume of liquid fuel chamber 107, as the liquid fuel is consumed, so that liquid fuel chamber 107 can be kept at atmospheric pressure even when liquid fuel chamber 107 is completely sealed with housing 102 with no gas pressure control hole and that the thickness of fuel cell 100 can be further reduced as compared with a case where a rigid housing 102 is used.

As used herein, the term "join or junction" means the formation of a state inseparable without application of external force and specifically means the formation of a state joined by a chemical bond, an anchor effect, or an adhesive force. For example, a hot pressing method or the like may be used for the junction.

Separating Layer

Examples of the separating layer for use in the invention include a layer that allows the liquid fuel to pass through by permeation and diffusion like the above-described liquid permeable membrane, a porous layer that allows the liquid fuel to pass through internal voids by capillary flow, and a layer that has holes passing through in the layer thickness direction and thus allows the liquid fuel to pass through the holes. In a mode, the separating layer may have holes passing through in the layer thickness direction, and the liquid fuel may be supplied to the anode through the holes. When such a mode is used, the separating layer is preferably formed such that the holes form a part of the exhaust passage. When the separating layer has holes passing through in the layer thickness direction, the liquid fuel passage in the separating layer may only be formed by the holes.

The separating layer is preferably a solid polymer electrolyte membrane. In this case, the separating layer has a relatively high affinity for the liquid fuel so that even when the amount of the supply of the liquid fuel to the anode is restricted, the supply can be efficiently performed, and the property of preventing exhaust gas from passing therethrough can be ensured. In particular, the solid polymer electrolyte membrane is preferably hydrocarbon-based, because such a membrane can sufficiently limit the amount of the supply of a high concentration liquid fuel.

For example, the hydrocarbon-based solid polymer electrolyte membrane may be a membrane made of at least one solid polymer electrolyte selected from the group consisting of sulfonated polyimide, sulfonated polyetheretherketone, sulfonated polyarylene ether, and sulfonated polystyrene.

When a liquid permeable membrane is formed as the separating layer according to the invention, any constituent material that is insoluble in the liquid fuel, allows the liquid fuel to penetrate and thus to pass therethrough, and hardly allows carbon dioxide gas (exhaust gas generated at the anode) to pass therethrough may be used to form the liquid permeable membrane. For example, a polymer membrane having a functional group such as a hydroxyl, amino, carboxyl, sulfone, phosphate, ether, or ketone group may be used. Specifically, a membrane made of a copolymer of a combination of polymer materials such as hydroxyethyl methacrylate, polyvinyl pyrrolidone, dimethylacrylamide, and glycerol methacrylate is preferably used.

Constituent materials with sufficient fuel-repellency may also be used such as sintered materials, foams or nonwoven fabrics made of hydrophobic chemical fibers such as olefin resin, aromatic polyester resin, or fluororesin fibers, and porous inorganic membranes such as carbon paper or cloth made of carbon fibers whose surface is treated to be fuel-repellent.

Examples of preferred constituent materials of the liquid permeable membrane include solid polymer electrolytes with high proton conductivity, such as sulfonated polyimide, sulfonated polyetheretherketone, sulfonated polyarylene ether, sulfonated polystyrene, and perfluorosulfonic acid polymer, because they can increase the efficiency of use of catalyst particles in anode catalyst layer 105a in which the continuity between electrolyte membrane 106 and the proton conducting path is not retained for the reason described later.

The liquid permeable membrane is preferably a solid polymer electrolyte membrane made of a hydrocarbon-based solid polymer electrolyte membrane. In this case, the permeability to the liquid fuel can be relatively low so that the amount of the supply of the liquid fuel to anode catalyst layer 105a can be limited even when a high concentration liquid fuel is used, and thus the concentration of the liquid fuel in anode catalyst layer 105a can be kept low even when a high concentration liquid fuel is supplied to liquid fuel chamber 107. Thus, a phenomenon in which the liquid fuel passes through electrolyte membrane 106 (namely the crossover phenomenon) can be suppressed.

More specifically, examples of the constituent material of the liquid permeable membrane with relatively low permeability to the liquid fuel include sulfonated polyimide, sulfonated polyetheretherketone, sulfonated polyarylene ether, and sulfonated polystyrene.

The combination of the liquid permeable membrane and the liquid fuel for use in the fuel cell of the invention is preferably such that the liquid permeable membrane has a swelling ratio of 120% or less in the liquid fuel. In this case, even if a high concentration liquid fuel is directly in contact with the liquid permeable membrane, a stress difference can hardly occur at the joint portion of the liquid permeable membrane joined to anode catalyst layer 105a and/or anode conductive layer 104a, so that peeling of the joint portion can be suppressed. Therefore, the formation of a space between anode catalyst layer 105a and the liquid permeable membrane by peeling can be suppressed, and the liquid fuel can be stably supplied to anode catalyst layer 105a.

Herein, the swelling ratio of the liquid permeable membrane is represented by the ratio of the length of the liquid permeable membrane in a specific direction in the liquid fuel to the length thereof in the same direction in a dry state.

When the constituent material of the liquid permeable membrane does not have sufficient resistance to solubilization by the liquid fuel, the three-dimensional network structure in the polymer material may be increased by electron beam irradiation, radiation exposure or the like so that the solubility in the liquid fuel can be reduced. When such a liquid permeable membrane capable of selectively allowing the liquid fuel to pass through and capable of resisting permeation of exhaust gas is used to form separating layer 103, the exhaust gas generated at anode catalyst layer 105a as described later is not discharged into liquid fuel chamber 107 but allowed to move in the in-plane direction in the interior of the pores formed at the interface between separating layer 103 and anode conductive layer 104a and at the interface between anode catalyst layer 105a and anode conductive layer 104a so that it is discharged out of fuel cell 100.

Figure 2:
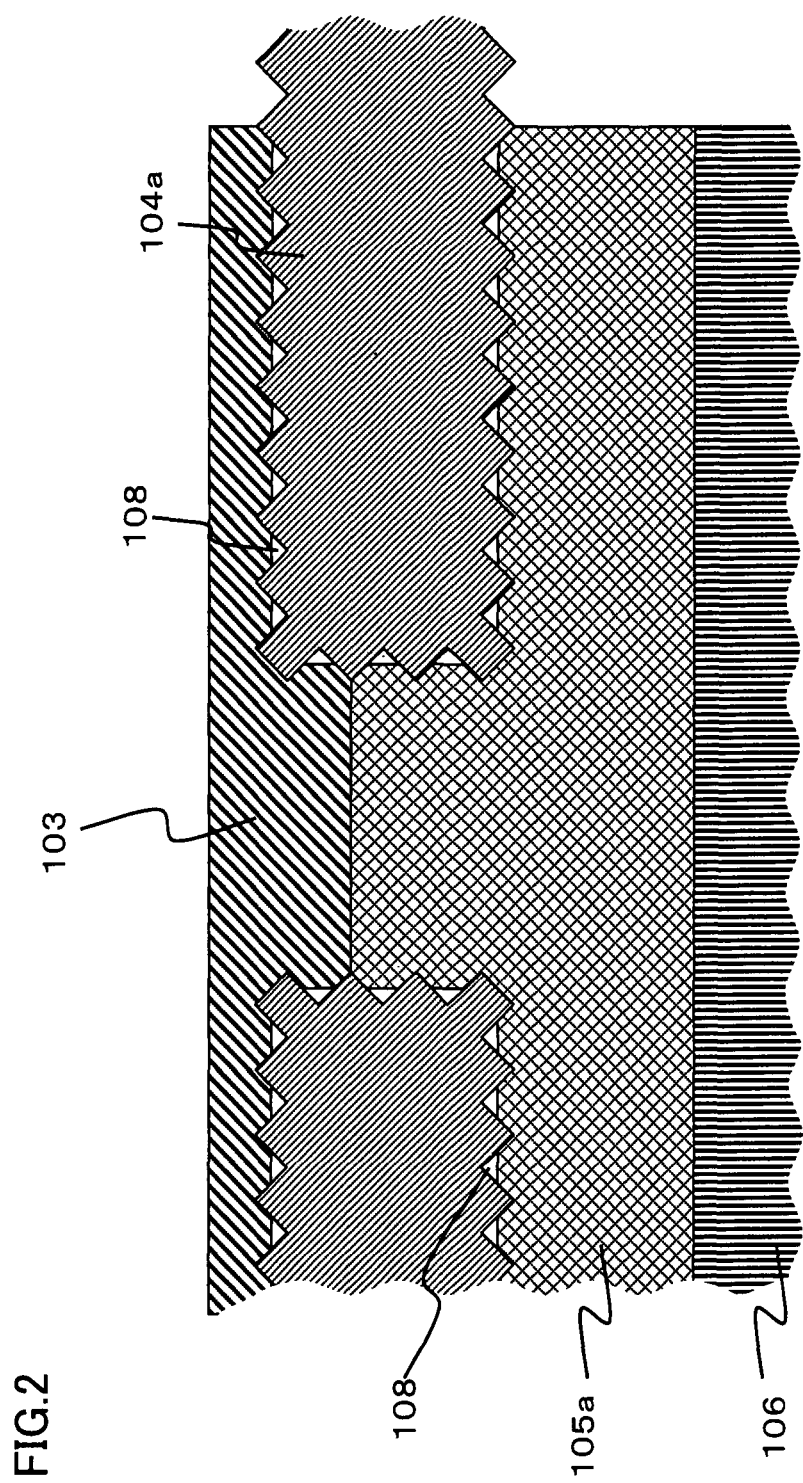
FIG. 2 is a cross-sectional view illustrating a case where irregularities are formed on the surface of an anode conductive layer in the fuel cell with the structure shown in FIG. 1.

In the invention, irregularities are preferably formed on the surface of the anode conductive layer. Referring to FIG. 2, irregularities are formed on the surface of anode conductive layer 104a, and the irregularities are not completely filled with separating layer 103 or anode catalyst layer 105a so that pores 108 are formed.

In FIG. 1, anode conductive layer 104a is configured to extend in the in-plane direction from the interface with anode catalyst layer 105a to the outside of the fuel cell, so that pores 108, which are formed at each interface with separating layer 103, anode catalyst layer 105a and anode conductive layer 104a, can also be continuously formed in the in-plane direction from anode catalyst layer 105a to the outside of the fuel cell. In this case, irregularities are formed on the anode conductive layer so that pores 108 can be used as an exhaust passage and that the exhaust gas generated at anode catalyst layer 105a can be discharged in the in-plane direction through pores 108 to the outside of the fuel cell. Even when anode conductive layer 104a is not exposed outside the fuel cell, an exhaust passage is formed such that the exhaust gas moving in the in-plane direction from pores 108 can be discharged out of the fuel cell or any other means may be used as needed.

When anode conductive layer 104a has continuous pores in the in-plane direction, the exhaust gas can also move inside the pores in anode conductive layer 104a so that the exhaust gas can be discharged out of fuel cell 100.

Embodiment 2

Figure 3:
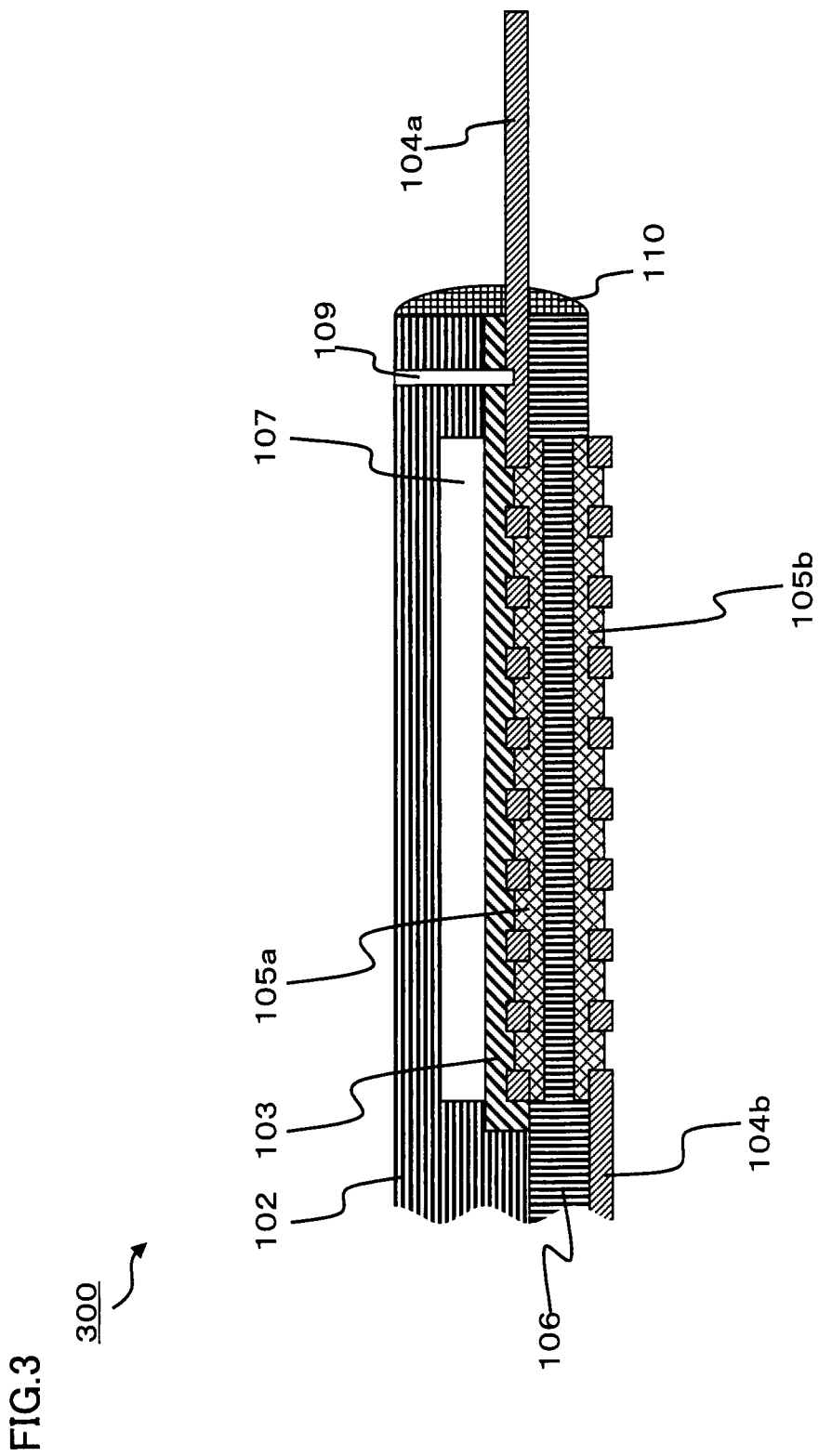
FIG. 3 is a cross-sectional view schematically showing another preferred structure of the fuel cell of the invention.

FIG. 3 shows a case where an exhaust passage is formed in a housing. In the invention, if it is difficult to discharge exhaust gas outside the fuel cell by allowing the exhaust gas to move inside the pores in anode conductive layer 104a, an exhaust passage 109 should preferably be formed in a part of housing 102 so as to be in contact with anode conductive layer 104a in a fuel cell 300 configured as shown in FIG. 3. In this structure, the exhaust gas generated at the anode can be immediately discharged out of the fuel cell. In this case, in order to obtain a strong junction between housing 102 and electrolyte membrane 106, the pores in anode conductive layer 104a may be filled with a gas impermeable sealant 110. Also in such a structure, the exhaust gas can be discharged out of the fuel cell through exhaust passage 109.

Electrically-Conductive Layer (Conductive Layer)

The liquid fuel supplied from liquid fuel chamber 107 passes through separating layer 103 and reaches anode conductive layer 104a. In the fuel cell of the invention, anode conductive layer 104a has the function of collecting electrons from anode catalyst layer 105a and the function of electrical wiring. The material for anode conductive layer 104a is preferably metal, because metal has small specific resistance and can suppress a reduction in voltage even when current is collected in the in-plane direction. Metallic materials having electron conductivity and having corrosion resistance in acid atmosphere are more preferred. Specifically, precious metals such as Au, Pt and Pd, metals such as C, Ti, Ta, W, Nb, Ni, Al, Cr, Ag, Cu, Zn, and Su, Si, and nitrides, carbides or the like of these metals, and alloys such as stainless steel, Cu—Cr, Ni—Cr, and Ti—Pt are preferably used, and the material more preferably contains at least one element selected from the group consisting of Pt, Ti, Au, Ag, Cu, Ni, and W.

When metals having poor corrosion resistance in acid atmosphere, such as Cu, Ag and Zn are used, precious metals or metals having corrosion resistance, such as Au, Pt and Pd, and electrically-conductive polymers, electrically-conductive nitrides, electrically-conductive carbides, electrically-conductive oxides, or the like may be used to form a surface coating. In this case, the fuel cell life can be prolonged.

In the invention, the anode conductive layer is preferably in the form of a porous layer, particularly a porous metal layer, such as a plate or foil having a plurality of holes, because such a layer allows the supply of the liquid fuel to the anode catalyst layer and provides high efficiency in the discharge of the exhaust gas generated at the anode. Irregularities are more preferably formed on the surface of the anode conductive layer.

In the invention, the irregularities formed on the anode conductive layer are preferably configured such that they cannot completely be buried with the separating layer or the anode catalyst layer in the process of manufacturing the fuel cell. For example, when the fuel cell is manufactured using a hot pressing process, the irregularities preferably have an average depth of 10 µm or more, so that the irregularities can be prevented from being completely buried with the separating layer or the anode catalyst layer.

The anode conductive layer is more preferably a porous layer such as a foam, a sintered body, a nonwoven fabric, and a woven fiber mesh, in order to facilitate the discharge of the exhaust gas generated at the anode. In particular, a porous metal layer of at least one selected from a metal mesh, a foam metal and a sintered metal material is preferred. In this case, anode conductive layer 104a has continuous voids in the layer thickness direction and in the in-plane direction, and the voids inside anode conductive layer 104a can also form exhaust gas passages, so that the discharge of the exhaust gas can be further facilitated.

When anode conductive layer 104a having continuous voids in the layer thickness direction and in the in-plane direction is used, the exhaust gas can pass through anode conductive layer 104a in the in-plane direction and can be discharged out of the fuel cell through an exhaust passage such as exhaust passage 109 shown in FIG. 3, even when the liquid permeable membrane is not directly in contact with the outside of the fuel cell.

Generally, in the power generation of the fuel cell, the electric potential of cathode conductive layer 104b is kept higher than that of anode conductive layer 104a, and therefore it is preferred that the material for cathode conductive layer 104b should have corrosion resistance equal to or better than anode conductive layer 104a.

While the material for cathode conductive layer 104b may be the same as that for anode conductive layer 104a, in particular, precious metals such as Au, Pt and Pd, metals such as C, Ti, Ta, W, Nb, and Cr, and nitrides, carbides or the like of these metals, and alloys such as stainless steel, Cu—Cr, Ni—Cr, and Ti—Pt are preferably used. When metals having poor corrosion resistance in acid atmosphere, such as Cu, Ag, Zn, and Ni are used, precious metals or metals having corrosion resistance and electrically-conductive polymers, electrically-conductive oxides, electrically-conductive nitrides, electrically-conductive carbides, or the like may be used to form a surface coating.

While cathode conductive layer 104b may be in the same form as described above for anode conductive layer 104a, cathode conductive layer 104b does not require the discharge of the exhaust gas in the in-plane direction, and thus a form composed of a plate or foil having a plurality of holes is preferably used.

Products formed by known conventional thin film formation techniques may be used as anode conductive layer 104a and cathode conductive layer 104b. Anode conductive layer 104a and cathode conductive layer 104b may be formed by a method including forming each patterned mask on a base layer, then forming a thin film, and separating the mask to form an electrode pattern. For example, the mask formation technique may be a photolithographic method. Examples of the thin film formation technique include MOCVD methods, sputtering methods, vacuum deposition methods, surface polymerization methods, sol-gel methods, and plating methods. Using these methods, fine electrode patterns with a line width of about ten µm or less can be formed. If electrically-conductive layers with high porosity and high aspect ratio are formed, therefore, there can be provided fuel cells with high liquid fuel diffusivity and with high current collecting characteristics and high conductivity. Alternatively, an inkjet print method may also be used. This case is preferred, because it does not require the use of a mask so that highly fine electrode patterns can be formed by a simplified process.

The porosity of anode conductive layer 104a and cathode conductive layer 104b is preferably, but not limited to, 10% or more, more preferably 40% or more. This is because if the porosity is 10% or more, a large area can be ensured for the diffusion of the liquid fuel in the anode and for the diffusion of air in the cathode, so that the supply of the liquid fuel to anode catalyst layer 105a and the supply of air to cathode catalyst layer 105b can be efficiently performed. The porosity of anode conductive layer 104a and cathode conductive layer 104b is preferably 95% or less, more preferably 90% or less. This is because if the porosity is 95% or less, it will be possible to reduce the distance in which generated electrons can travel in the in-plane direction in anode catalyst layer 105a with a specific resistance higher than that of anode conductive layer 104a before the electrons are withdrawn from anode conductive layer 104a, so that the voltage loss due to resistance can be reduced. When electrons withdrawn from anode conductive layer 104a toward an external circuit move to cathode catalyst layer 105b through cathode conductive layer 104b, the voltage loss due to resistance can also be reduced.

In this situation, generally, the formula $R=\rho L/S$ ($\rho$: resistivity) can be applied with respect to the resistance R of a rod-shaped object with a cross-sectional area S and a length L, and the larger the cross-sectional area S, the voltage loss due to the resistance can be smaller. In particular, the cross-sectional area S of anode conductive layer 104a and cathode conductive layer 104b in the layer thickness direction depends on the porosity, and the larger the porosity, the smaller the cross-sectional area S in the layer thickness direction. When the porosity is set at a specific value, the thicknesses of anode conductive layer 104a and cathode conductive layer 104b are preferably increased in order to increase the cross-sectional area S in the layer thickness direction.

Catalyst Layer

In the fuel cell of the invention, for example, anode catalyst layer 105a and cathode catalyst layer 105b to be used may include a catalyst-supporting electric conductor and an electrolyte. Examples of the catalyst include precious metals such as Pt, Ru, Au, Ag, Rh, Pd, Os, and Ir, and base metals such as Ni, V, Ti, Co, Mo, Fe, Cu, and Zn. These may be used alone or in combination of two or more thereof. Anode catalyst layer 105a and cathode catalyst layer 105b are not necessarily of the same type, and different substances may be used.

The electric conductor to be used may be carbon powder or carbon fiber, such as acetylene black, Vulcan, Ketjenblack, furnace black, VGCF, carbon nanotube, carbon nanohorn, and fullerene, an electrically-conductive inorganic material, or a metal. For example, the electrolyte to be used may be Nafion series (manufactured by DuPont), Aciplex series (manufactured by Asahi Kasei Corporation), Flemion series (manufactured by Asahi Glass Co., Ltd.), and electrolyte materials for use in the electrolyte membrane described below. PTFE or PVDF may be added to impart water repellency, and silica particles, hygroscopic resins or the like may be added to impart hydrophilicity.

Electrolyte Membrane

In the fuel cell of the invention, electrolyte membrane 106 has functions to transfer protons from anode catalyst layer 105a to cathode catalyst layer 105b and to prevent short-circuit by maintaining the electric insulation between anode catalyst layer 105a and cathode catalyst layer 105b.

Any material having proton conductivity and electrically-insulating properties may be used for electrolyte membrane 106, and a polymer membrane, an inorganic membrane or a composite membrane may be used. Examples of the polymer membrane include perfluorosulfonic acid-based electrolyte membranes such as Nafion series (manufactured by DuPont), Aciplex series (manufactured by Asahi Kasei Corporation) and Flemion series (manufactured by Asahi Glass Co., Ltd.), and also include hydrocarbon-based electrolyte membranes such as polystyrene sulfonic acid and sulfonated polyetheretherketone membranes. Examples of the inorganic membrane include phosphate glass, cesium hydrogen sulfate, polytungstophosphoric acid, and ammonium polyphosphate membranes. Examples of the composite membrane include a sulfonated polyimide polymer membrane, a composite of an inorganic material such as tungstic acid and an organic material such as polyimide, and specifically include Gore-Select membranes (manufactured by Gore) and pore-filling electrolyte membranes.

Porous Membrane

In the cathode of the fuel cell of the invention, a porous layer may be integrally formed such that cathode conductive layer 104b and cathode catalyst layer 105b are covered therewith. This structure can prevent the inhibition of the air supply from the atmosphere when water is generated at cathode catalyst layer 105b to form a water film over cathode catalyst layer 105b or can prevent dryness of cathode catalyst layer 105b due to remarkably rapid evaporation of water.

Any material and form that allow atmospheric oxygen to pass through and to be supplied to cathode catalyst layer 105b may be used for the porous layer. For example, electron conductive materials may be used, such as nonwoven fabrics of carbon fibers such as carbon paper, nonwoven fabrics of metal fibers, cloth composed of braided carbon fiber bundles, and a water-repellent porous sheet composed of dispersed carbon or metal particles and a binder of polytetrafluoroethylene. When electron conductive materials are used, it is possible to facilitate receiving electrons from cathode conductive layer 104b and transferring electrons to cathode catalyst layer 105b. On the other hand, in order to prevent electrical short-circuit to the outside of the fuel cell, insulating materials are preferably used, such as fabrics or nonwoven fabrics composed of braided bundles of polymer fibers such as polyester fibers, for example, polyethylene terephthalate fibers, and porous sheets of polytetrafluoroethylene or polyimide.

Composition of Fuel Electrode

Figure 4:
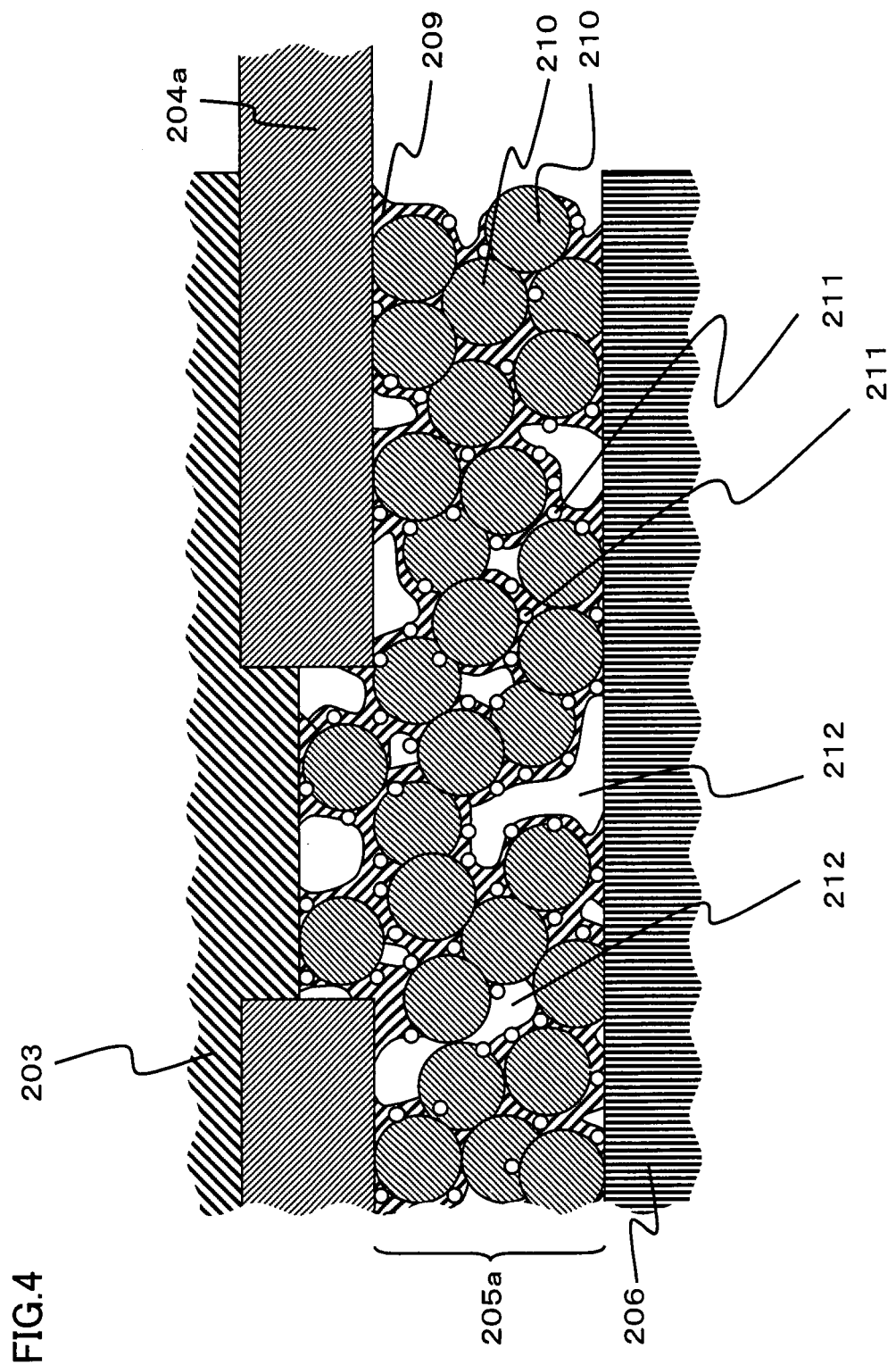
FIG. 4 is a cross-sectional view illustrating a preferred structure of an anode side portion of the fuel cell of the invention.

Preferred compositions are described below in more detail with respect to the separating layer and the anode in the fuel cell of the invention. The anode catalyst layer formed according to the invention preferably has continuous holes in the layer thickness direction. FIG. 4 shows a case where an anode catalyst layer 205a has continuous pores in the layer thickness direction in the fuel cell of the invention. Anode catalyst layer 205a shown in FIG. 4 is composed of an electrolyte 209 and an anode catalyst-supporting conductor including an anode conductor 210 and anode catalyst particles 211 supported by the conductor 210.

Anode catalyst particles 211 decompose the liquid fuel into protons and electrons. Electrolyte 209 transfers the generated protons to an electrolyte membrane 206. Anode conductor 210 conducts the generated electrons to an anode conductive layer 204a. Exhaust gas generated at the anode passes through pores 212 and passes in the in-plane direction through the pores formed at the interface between a separating layer 203 and anode conductive layer 204a and optionally passes in the in-plane direction through the pores in the interior of anode conductive layer 204a when anode conductive layer 204a is a porous layer, so that it is discharged out of the fuel cell.

In the invention, anode conductor 210 does not necessarily have to be used, when anode catalyst particles 211 are provided in a continuous state so that electrons generated in anode catalyst layer 205a can be conducted to anode conductive layer 204a.

Electrolyte 209 has functions to conduct protons generated by the decomposition of the liquid fuel and to be impregnated with the liquid fuel. Electrolyte 209 is preferably joined to separating layer 203. In this case, the liquid fuel infiltrated into separating layer 203 can be infiltrated, into electrolyte 209 without leaking into pores 212, and the liquid fuel is supplied to anode catalyst particles 211 through electrolyte 209.

In addition, separating layer 203 is more preferably joined to anode conductive layer 204a. If separating layer 203 is joined to electrolyte 209 and to anode conductive layer 204a, dissociation between electrolyte 209 and separating layer 203 can be prevented even when the internal pressure of pores 212 is raised by the generation of exhaust gas at the anode, because separating layer 203 is supported by anode conductive layer 204a, so that the supply of the liquid fuel to anode catalyst layer 205a is not inhibited and that stable power generation characteristics can be maintained in the fuel cell.

In the structure shown in FIG. 4, the force acting on the infiltration of the liquid fuel into electrolyte 209 is used as a driving force for the supply of the liquid fuel from separating layer 203 to electrolyte 209. Thus, the amount of the supply of the liquid fuel is prevented from exceeding the amount of the infiltration into electrolyte 209, and the liquid fuel is prevented from leaking into pores 212. Thus, pores 212 continuously formed in the layer thickness direction are always kept in a vapor phase state. Specifically, continuous holes holding a vapor phase without a liquid phase are formed as exhaust gas passages from anode catalyst layer 205a to the outside of the fuel cell through the pores at the interface between anode catalyst layer 205a and separating layer 203. Thus, the liquid fuel can be prevented from leaking outside the fuel cell, and at the same time, pressure loss can be reduced as much as possible for the discharge of the exhaust gas generated at anode catalyst particles 211 to the outside of the fuel cell, so that a pressure rise can be well suppressed at anode catalyst layer 205a.

Concerning the electrolyte in the anode catalyst layer, there is generally a trade-off between the proton conductivity and the solubility in the liquid fuel. In order to obtain high power generation characteristics, it is necessary to improve proton conductivity by increasing the concentration of the acid functional group of the electrolyte. However, there is a problem in which when the concentration of the acid functional group of the electrolyte is increased, the solubility in the liquid fuel is also increased (trade-off relationship) so that the electrolyte can be dissolved in the liquid fuel and thus high power generation characteristics cannot be maintained.

When separating layer 203 is joined to electrolyte 209 and anode conductive layer 204a, the liquid fuel can be supplied to anode catalyst layer 205a only in an amount that can infiltrate into electrolyte 209 of anode catalyst layer 205a. Thus, some materials soluble in the liquid fuel may also be selected for electrolyte 209 in anode catalyst layer 205a. Namely, even a material whose solubility increases when the acid functional group is increased for the purpose of achieving high power generation characteristics may be used as the electrolyte.

Embodiment 3

Figure 5:
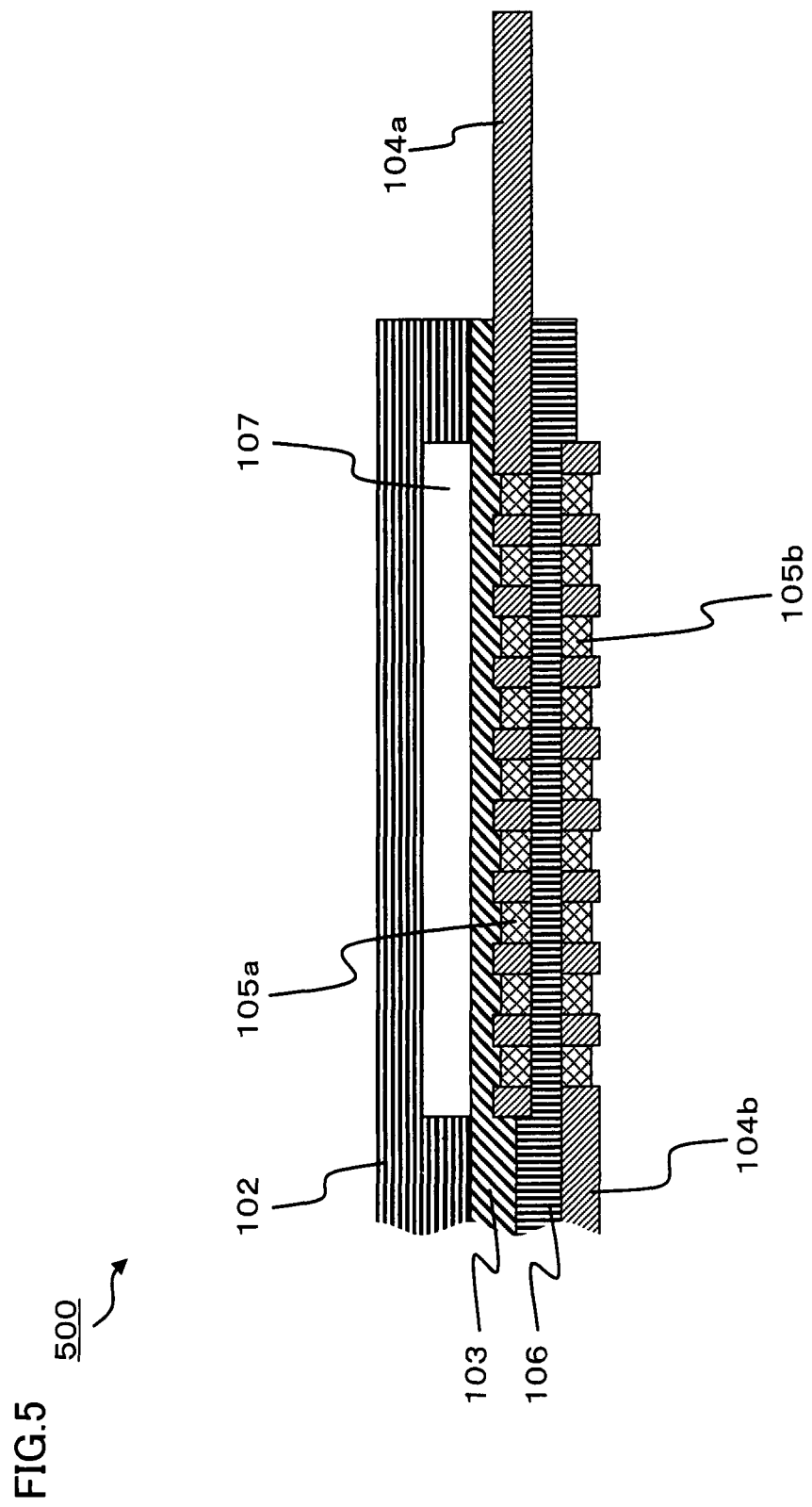
FIGS. 5, 6 and 7 are cross-sectional views schematically showing other preferred structures of the fuel cell of the invention.

FIG. 5 shows a case where the anode conductive layer is joined to the electrolyte membrane. In the invention, if only a material completely soluble in the liquid fuel is used as the electrolyte, it can become impossible to maintain the shape of anode catalyst layer 205a. Thus, the anode conductive layer is preferably joined to the electrolyte membrane, as represented by anode conductive layer 104a and electrolyte membrane 106 in the structure of a fuel cell 500 shown in FIG. 5. In this case, even when electrolyte 209 in anode catalyst layer 205a is dissolved so that it becomes difficult to maintain the shape of anode catalyst layer 205a, the dissociation between anode catalyst layer 205a and electrolyte membrane 206 can be suppressed so that stable power generation characteristics can be maintained in the fuel cell, because separating layer 203, anode conductive layer 204a and electrolyte membrane 206 are joined.

Anode catalyst particles 211 function as a catalyst for the decomposition of the liquid fuel and are preferably made of precious metal including Pt as a main component because of good catalysis and are preferably in the form of particles with a particle size of 10 nm or less.

Anode conductor 210 has functions to support anode catalyst particles 211 and to conduct electrons. Any material having corrosion resistance at a certain electric potential in acid atmosphere and having electrical conductivity may be used to form anode conductor 210. For example, carbon particles such as acetylene black, Vulcan, Ketjenblack, and furnace black, carbon fibers such as VGCF, carbon nanotube, carbon nanohorn, and fullerene, particles of precious metal such as Pt, Au and Pd, and particles or fibers of corrosion resistant metal such as Ti, Ta, W, and Cr are preferably used.

Embodiment 4

Figure 6:
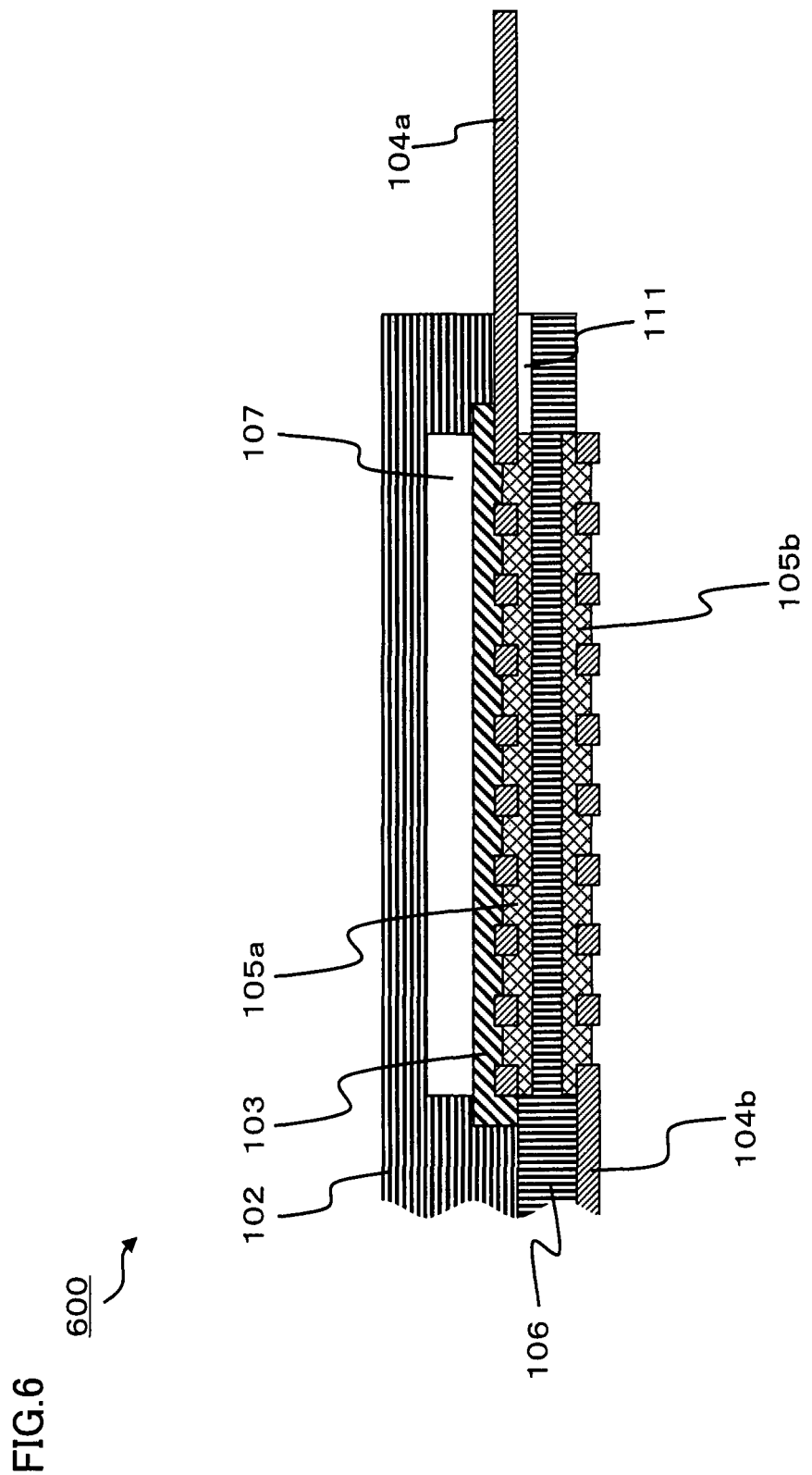

In the invention, when exhaust gas mainly generated at the anode is discharged from anode catalyst layer 105a to the outside of the fuel cell directly through an exhaust passage 111 as in the structure of a fuel cell 600 shown in FIG. 6, a needle-shaped anode conductor is preferably used, such as VGCF, carbon nanotube and carbon nanohorn. In this case, if the ratio of the volume of pores 212 to the volume of anode catalyst layer 105a (hereinafter simply referred to as "the volume ratio") is increased, the discharge of exhaust gas in the in-plane direction can be facilitated so that the exhaust gas can be directly discharged from anode catalyst layer 105a to the outside of the fuel cell.

For example, when anode conductive layer 104a used has continuous voids in the layer thickness direction (like a plate or foil having a plurality of holes), the volume ratio of pores 212 in anode catalyst layer 205a as shown in FIG. 2 is preferably 50% or more, in order that the exhaust gas may be allowed to pass through mainly in the in-plane direction of anode catalyst layer 105a and that the exhaust gas-induced rise in the internal pressure of the anode may be controlled.

On the other hand, for example, when anode conductive layer 104a used has continuous voids in the layer thickness direction and in the in-plane direction (like a foam, a sintered body, a nonwoven fabric, a woven fiber mesh, or the like), the volume ratio of pores 212 is preferably 10% or more, because the exhaust gas may only be allowed to pass through mainly in the layer thickness direction of anode catalyst layer 205a.

Embodiment 5

Figure 7:
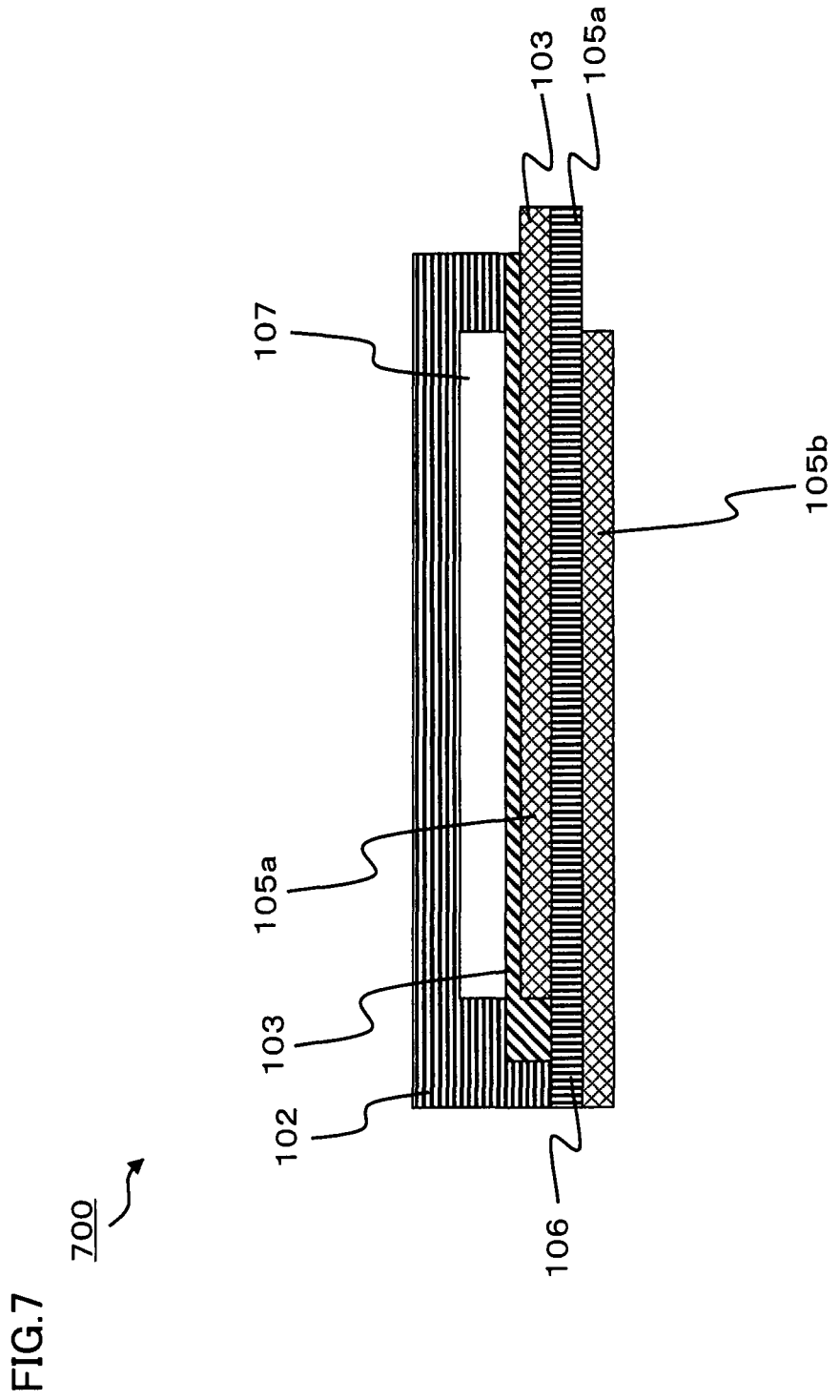

In the invention, when the volume ratio of pores 212 is set at 50% or more and when the exhaust gas is discharged in the in-plane direction of anode catalyst layer 205a to the outside of the fuel cell, anode catalyst layer 105a may be extended to the outside of the fuel cell as in the structure of a fuel cell 700 shown in FIG. 7, so that the function of the anode conductive layer can be imparted to anode catalyst layer 105a and that the anode conductive layer can be omitted.

When a highly proton-conductive solid polymer electrolyte membrane is used as the separating layer in the fuel cell of the invention and when the anode conductive layer has continuous holes in the layer thickness direction, the proton conductivity is maintained between the separating layer and the anode catalyst layer so that the effect and advantage described below can be obtained.

Figure 8:
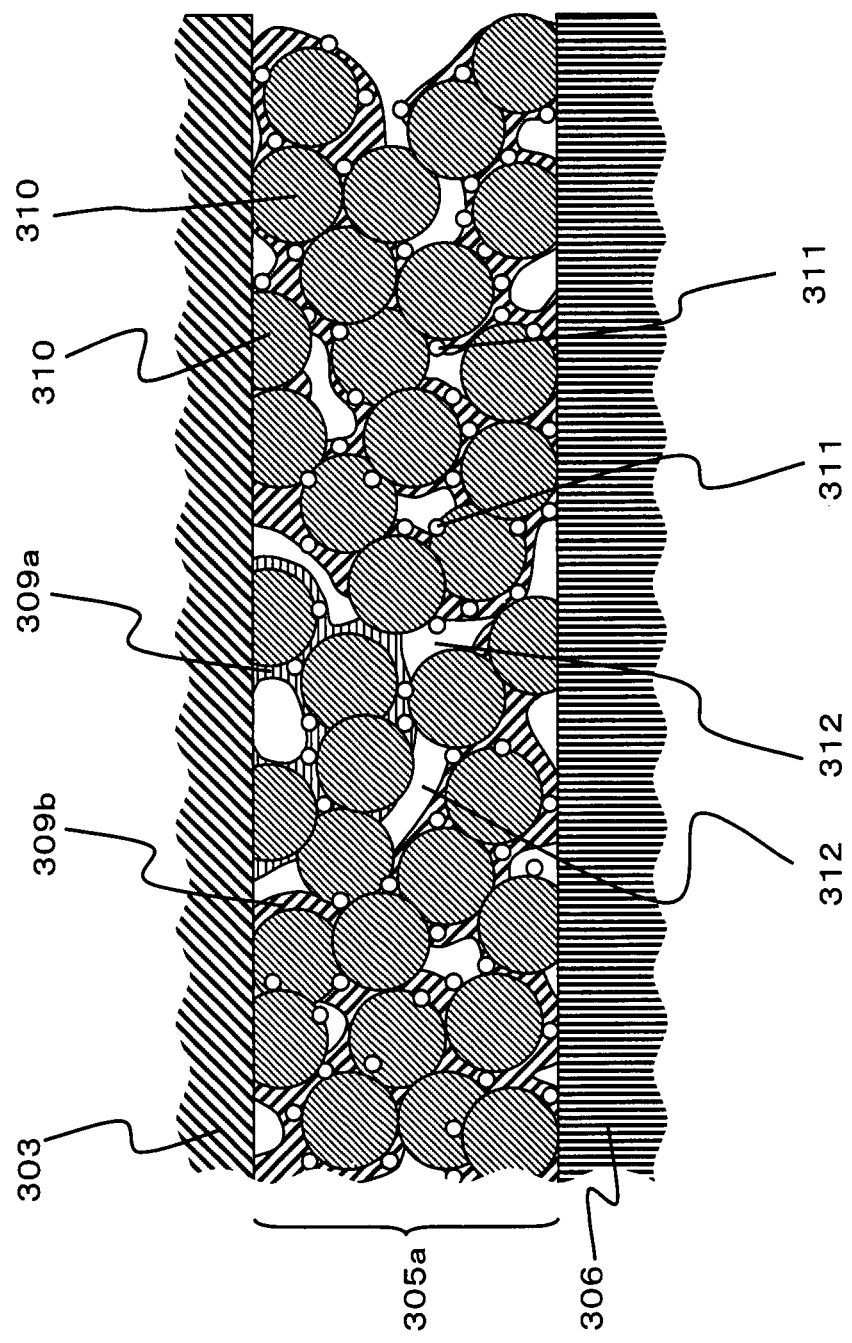
FIG. 8 is a diagram illustrating the effect and advantage of a case where a liquid permeable membrane made of a solid polymer electrolyte membrane is provided as a separating layer.

Referring to FIG. 8, among anode catalyst particles in the anode catalyst layer, anode catalyst particles 311 that are not in contact with the electrolyte membrane and are located in an isolated electrolyte 309a cannot contribute to the reaction at the anode, when they do not have proton-conductive continuity with the electrolyte membrane. However, when a proton-conductive solid polymer electrolyte membrane is used as the separating layer, a continuous electrolyte 309b exists to provide proton-conductive continuity between a separating layer 303 and an electrolyte membrane 306 as shown in FIG. 8, so that isolated electrolyte 309a located on the surface of an anode catalyst layer 305a can also maintain the proton-conductive continuity with electrolyte membrane 306. Thus, protons generated at anode catalyst particles 311 in isolated electrolyte 309a travel through isolated electrolyte 309a, separating layer 303 and continuous electrolyte 309b in this order to reach electrolyte membrane 306 so that they can contribute to the reaction.

Embodiment 6

Figure 9:
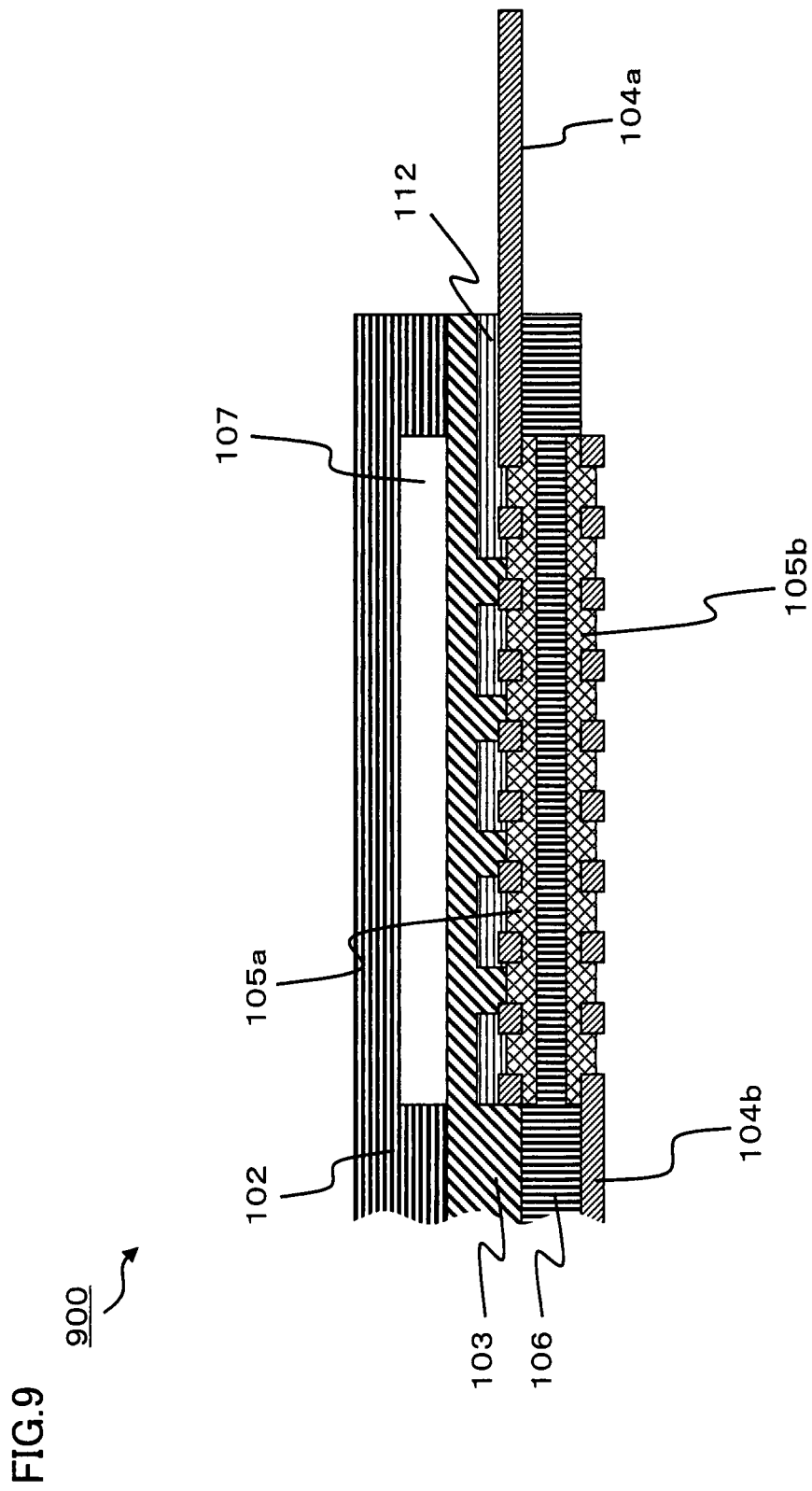
FIG. 9 is a cross-sectional view schematically showing another preferred structure of the fuel cell of the invention.

FIG. 9 shows a case where a porous substrate 112 is placed between separating layer 103 and anode conductive layer 104a in a fuel cell 900.

Referring to FIG. 9, fuel cell 900 includes an anode composed of anode catalyst layer 105a, anode conductive layer 104a and porous substrate 112, electrolyte membrane 106, and a cathode composed of cathode catalyst layer 105b and cathode conductive layer 104b. Separating layer 103 and porous substrate 112 are provided in contact with anode catalyst layer 105a, and housing 102 is also provided. Namely, FIG. 9 shows a case where a laminated structure is formed in which the porous substrate, the anode conductive layer, the anode catalyst layer, the electrolyte membrane, the cathode catalyst layer, and the cathode conductive layer are joined in this order.

In the structure shown in FIG. 9, housing 102 and separating layer 103 form liquid fuel chamber 107. Porous substrate 112 extends in the in-plane direction to the outside of fuel cell 900, and separating layer 103 and porous substrate 112 are configured so as to be adjacent to anode catalyst layer 105a.

The liquid fuel is charged into liquid fuel chamber 107 and allowed to pass through separating layer 103 and thus supplied to anode catalyst layer 105a adjacent thereto. The exhaust gas generated at anode catalyst layer 105a is discharged to the outside of the fuel cell through porous substrate 112 adjacent thereto. In this case, even when anode conductive layer 104a having continuous holes only in the layer thickness direction is joined to separating layer 103, anode catalyst layer 105a and porous substrate 112 in such a manner that their interfaces have no pore, the exhaust gas can be discharged from anode catalyst layer 105a to the outside of the fuel cell through porous substrate 112.

Embodiment 7

Concerning this embodiment, a description is given of a typical example of the fuel cell system equipped with the fuel cell of the invention. Although the structure of the fuel cell is not specifically described below, the same structure as described for Embodiment 1 may be preferably employed.

Figure 10:
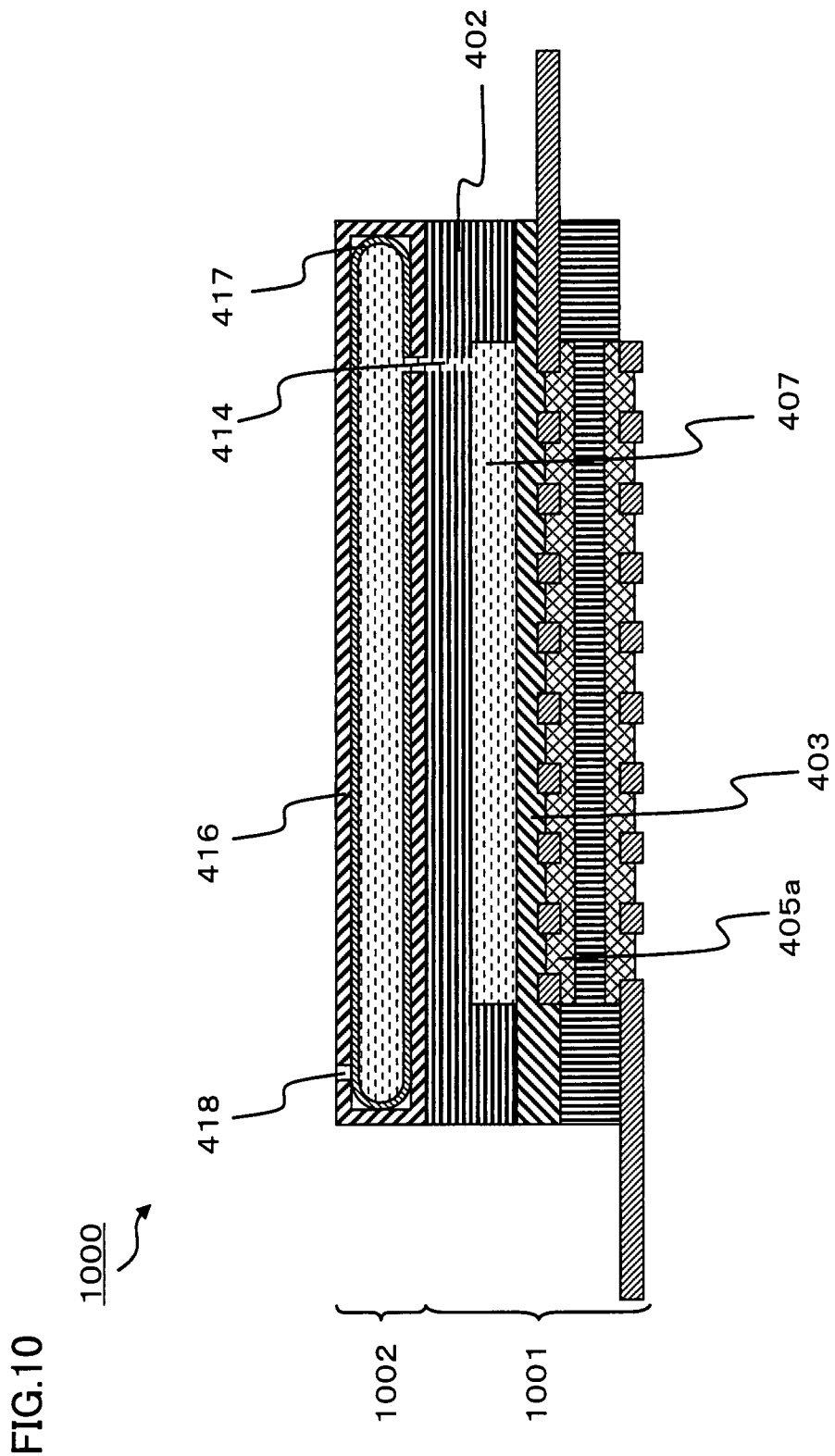
FIG. 10 is a diagram illustrating an exemplary fuel cell system using the fuel cell of the invention.

Referring to FIG. 10, a fuel cell system 1000 is composed of a fuel cell 1001 provided with a fuel supply hole 414 and a fuel vessel 1002. Fuel vessel 1002 is composed of a fuel supply chamber 416, a fuel reservoir 417, and a pressure control mechanism 418. A liquid fuel is charged into fuel reservoir 417, and the space enclosed by a housing 402 and a separating layer 403 forms a liquid fuel chamber 407. Housing 402 and fuel reservoir 417 are connected via at least one fuel supply hole 414, so that the liquid fuel is supplied from fuel reservoir 417 to liquid fuel chamber 407 through fuel supply hole 414.

Fuel reservoir 417 communicates only with liquid fuel chamber 407 of fuel cell 1001 through fuel supply hole 414 and is isolated from the outside. Fuel supply chamber 416 is configured so as to be placed over fuel reservoir 417. Fuel supply chamber 416 is provided with at least one pressure control mechanism 418, so that the interior of fuel supply chamber 416 can be kept at atmospheric pressure.

When fuel cell 1001 is operated, the liquid fuel is charged into liquid fuel chamber 407 and allowed to pass through separating layer 403 and consumed at an anode catalyst layer 405a. In fuel cell 1001 of this embodiment, separating layer 403 used is composed of the same liquid permeable membrane as described for Embodiment 1, and thus the exhaust gas generated at anode catalyst layer 405a is not discharged to liquid fuel chamber 407. Therefore, when the liquid fuel is consumed, the internal pressure of liquid fuel chamber 407 is reduced to be lower than atmospheric pressure. When fuel supply chamber 416 is provided with pressure control mechanism 418 as shown in FIG. 10, the internal pressure of fuel supply chamber 416 is kept at atmospheric pressure, and the liquid fuel stored in fuel reservoir 417 is supplied to liquid fuel chamber 407 through fuel supply hole 414.

A fuel bag made of a flexible material may be preferably used for fuel reservoir 417. In this case, fuel reservoir 417 is designed to deflate so that a reduction in the internal pressure can be compensated for when the volume of the liquid fuel stored in fuel reservoir 417 is reduced and that the internal pressure of fuel reservoir 417 can be constantly kept at atmospheric pressure.

Each element of fuel cell system 1000 of the invention is described below. Fuel vessel 1002 is preferably configured to be detachable from fuel cell 1001. In this case, after the liquid fuel stored in fuel vessel 1002 is consumed, fuel vessel 1002 may be detached from fuel cell 1001 and replaced with a new fuel vessel 1002 filled with the liquid fuel. In fuel cell system 1000 having such a structure, fuel vessel 1002 can be changed one after another to allow prolonged operation.

Fuel supply chamber 416 has the function of protecting fuel reservoir 417 from the environment. The material for fuel supply chamber 416 is preferably a material that has certain stiffness so as to make fuel reservoir 417 non-crushable by external factors, such as plastics such as acrylic and polyethylene terephthalate, and metals such as stainless steel and aluminum.

Fuel reservoir 417 has the function of preventing the evaporation of the liquid fuel. When fuel reservoir 417 is made of a flexible material, it also has a function to constantly keep the internal pressure of fuel reservoir 417 at atmospheric pressure in such a manner that its volume decreases as the volume of the liquid fuel decreases. For example, the material for fuel reservoir 417 is preferably a plastic material such as polyimide, polyethylene terephthalate, polyethylene, polyarylate, polyetheretherketone, polyetherimide, polyamide-imide, polyethersulfone, polyphenylene oxide, polytetrafluoroethylene, and polyvinylidene fluoride. In order to further suppress the evaporation of the liquid fuel, a material composed of an aluminum foil coated with the above plastic material is more preferably used.

Embodiment 8

Figure 11:
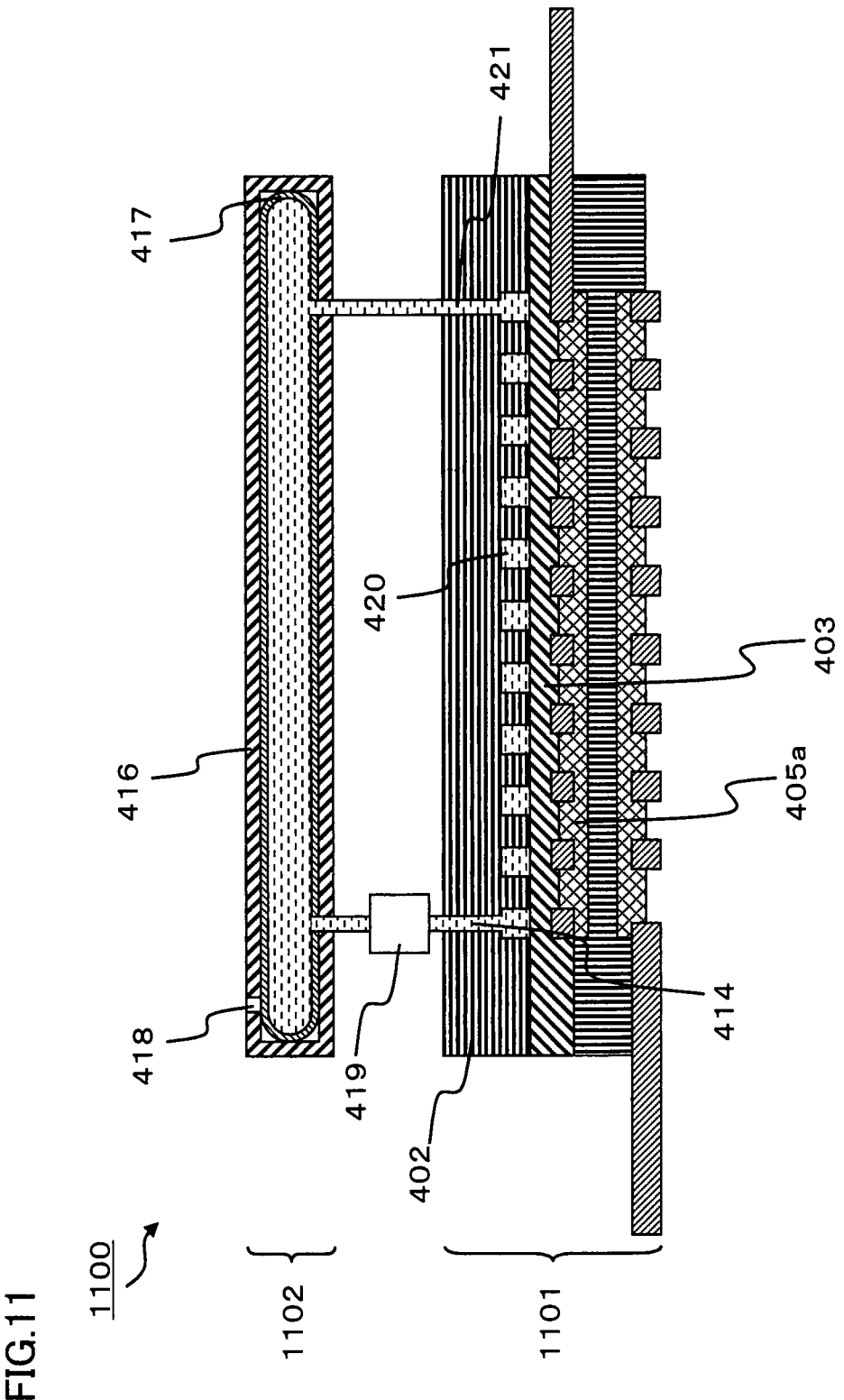
FIG. 11 is a diagram illustrating an exemplary active fuel cell system using the fuel cell of the invention.

Referring to FIG. 11, a fuel cell system 1100 includes fuel supply hole 414 provided with a liquid pump 419 for supplying the liquid fuel from a fuel vessel 1102 to a fuel cell 1101, and a fuel supply channel 420. A fuel discharge hole 421 is also provided to discharge the liquid fuel from fuel supply channel 420 to fuel reservoir 417.

When fuel cell 1101 is operated, an external power from liquid pump 419 or the like is used so that the liquid fuel is forcibly supplied from fuel vessel 1102 to fuel supply channel 420 through fuel supply hole 414 and discharged through fuel discharge hole 421 back to fuel vessel 1102.

The liquid fuel flowing through fuel supply channel 420 is allowed to pass through separating layer 403 and consumed at anode catalyst layer 405a. In fuel cell 1101 of this embodiment, separating layer 403 used is composed of the same liquid permeable membrane as described for Embodiment 1, and thus the exhaust gas generated at anode catalyst layer 405a is not discharged to liquid fuel chamber 407. Therefore, the problem in which the exhaust gas stays in fuel supply channel 420 to inhibit the supply of the liquid fuel to anode catalyst layer 405a can be overcome, which would otherwise occur in conventional active fuel cell systems.

In conventional active fuel cell systems, the flow rate of the liquid fuel has to be set at a certain value that prevents the exhaust gas from staying in the fuel supply channel. In the active fuel cell system of this embodiment, however, the flow rate can be reduced to be lower than that of conventional systems, so that the fuel cell system can use a small pump and can be reduced in size.

Embodiment 9

In the invention, the separating layer preferably has a hole passing through in the layer thickness direction. In this case, it is preferred that the liquid fuel should be supplied to the anode through the hole and that the hole should form a part of the exhaust passage according to the invention. The case where the separating layer is formed so as to have a hole passing through in the layer thickness direction is described with reference to FIGS. 12 and 13. Although the structure of the fuel cell is not specifically described below, the same structure as described for Embodiment 1 may be preferably employed.

Figure 12:
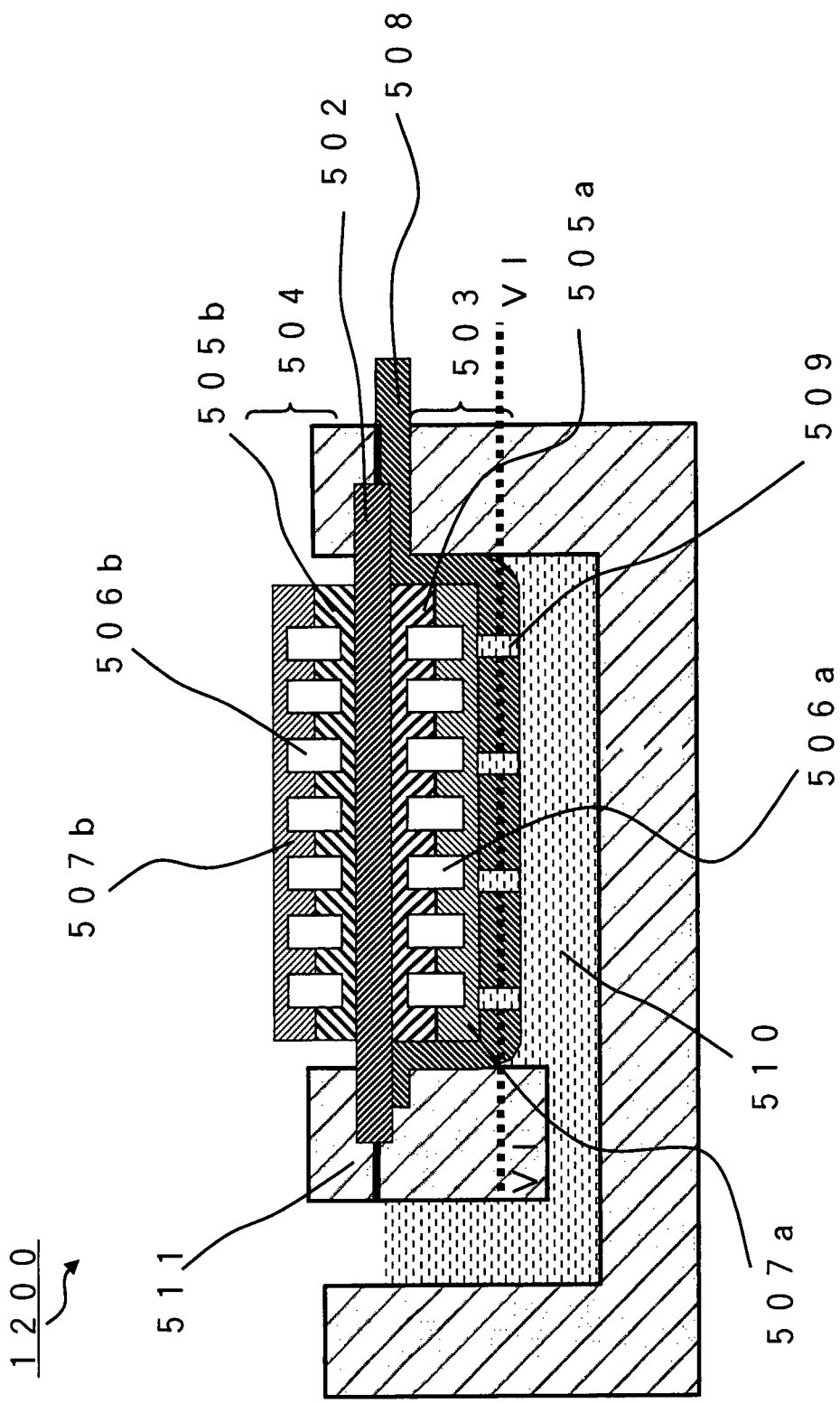
FIG. 12 is a cross-sectional view schematically showing another preferred structure of the fuel cell of the invention.

Referring to FIG. 12, a fuel cell 1200 includes: an anode 503 composed of an anode catalyst layer 505a, an anode conductive layer 506a and a porous substrate 507a; an electrolyte membrane 502; a cathode 504 composed of a cathode catalyst layer 505b, a cathode conductive layer 506b and a porous substrate 507b; a separating layer 508 in contact with anode 503; and a housing 511. In the structure shown in FIG. 12, housing 511 and separating layer 508 form a liquid fuel chamber 510. Separating layer 508 is provided with holes 509 passing through in the layer thickness direction, and the liquid fuel is supplied through holes 509.

The liquid fuel is charged into liquid fuel chamber 510 and allowed to pass through holes 509 of separating layer 508 and supplied into anode 503. Holes 509 of separating layer 508 form a part of the exhaust passage according to the invention. Typically, the exhaust gas generated by the decomposition of the liquid fuel at anode 503 is allowed to move from holes 509 of separating layer 508 in the in-plane direction along the exhaust passage continuously formed in the in-plane direction in the interior of separating layer 508 and discharged out of the fuel cell.

In the structure shown in FIG. 12, the above-described mechanism allows the exhaust gas generated at the anode to move in the in-plane direction and to be discharged, so that the contamination of the liquid fuel chamber with the exhaust gas can be prevented even when a large number of holes 509 are formed. If carbon dioxide is discharged in the layer thickness direction and released to the open air, the liquid fuel from holes can travel a relatively long distance, because the liquid fuel is supplied in the in-plane direction. In the invention, however, the exhaust gas is discharged in the in-plane direction so that the liquid fuel from holes 509 can travel a relatively short distance when the liquid fuel is distributed to the whole of anode 503 through holes 509. Thus the pressure loss can be reduced, and passive fuel supply can be achieved using gravity or fine pressure difference and using as little electric power as possible.

Since separating layer 508 having holes 509 is provided, the exhaust gas generated at anode 503 is drawn into gas discharge pores of separating layer 508. In this process in anode 503, a negative pressure is generated in a space from which the exhaust gas has been drawn, and the liquid fuel is then drawn into the space, so that the liquid fuel supply is accelerated to allow stable high power generation.

In fuel cell 1200 shown in FIG. 12, the respective layers of anode 503 and separating layer 508 are preferably joined together. In addition, it is preferred that separating layer 508, porous substrate 507a, anode conductive layer 506a, anode catalyst layer 505a, electrolyte membrane 502, cathode catalyst layer 505b, cathode conductive layer 506b, and porous substrate 507b should be stacked in this order and joined together. The contact resistance at the interface between the respective layers can be kept low by the junction, and holes 509 of separating layer 508 and gas discharge pores can be prevented from being crushed. When separating layer 508 is a porous layer, the porous separating layer 508 can be expanded by the pressure of the exhaust gas generated at anode 503 and then shrunk to form a space between anode conductive layer 506a and separating layer 508 when a switch is turned off or when the current output is reduced. Even in such a case, the junction structure as described above can ensure the electrical conductivity between anode catalyst layer 505a and anode conductive layer 506a. Thus, if the space has such a distance that the gas-liquid separation effect can be produced, a significant reduction in output can be prevented, which would otherwise be caused by an increase in ohmic resistance, so that a fuel cell with high long-term reliability and high exhaust gas discharge efficiency can be obtained.

For example, the junction may be formed by a hot pressing method including fusion bonding of separating layer 508, porous substrate 507a, anode conductive layer 506a, anode catalyst layer 505a, electrolyte membrane 502, cathode catalyst layer 505b, cathode conductive layer 506b, and porous substrate 507b. For example, a polymer binder in the catalyst layer, a polymer binder on a water repellent treated surface of the porous substrate, or the like is deformed by heat during hot pressing so that the junction can be ensured by a three-dimensional anchor effect. Thus, the electrical contact between the electrically-conductive layer and the catalyst layer can be maintained well without application of external pressure by pinching with supporting substrates, fastening with bolts and nuts, or the like. In order to apply the external pressure, some portions are pressed such that a pressure can be applied to the areas of anode catalyst layer 505a and cathode catalyst layer 505b, so that the supply of the fuel or air can be hindered. Therefore, the method without the application of the external pressure is also advantageous, because it does not inhibit the supply of the fuel or air and particularly because it allows a sufficient air supply.

While the order of the junction is not limited to the above, the electrically-conductive layer is preferably joined to the electrolyte membrane. Such a junction can provide higher adhesion strength than a structure having the electrolyte membrane and the electrically-conductive layer joined with the porous catalyst layer interposed therebetween. In addition, there is no exchange with respect to protons and electrons at the interface between the electrically-conductive layer and the electrolyte membrane, and thus the function of electrical conductivity and/or proton conductivity is not necessarily required, so that the junction can be formed with an adhesive layer by a relatively inexpensive adhesive.

In the invention, the separating layer is typically formed such that one end of separating layer 508 is extended so as to be in contact with the outside of the fuel cell as shown in FIG. 12. In this case, the exhaust gas generated at anode 503 may be discharged from separating layer 508 to the outside of the fuel cell through an exhaust port that is preferably formed and has a filter function to remove volatile organic substances. In this case, safer and thinner fuel cells can be obtained.

The same material as that described above for electrolyte membrane 106 may be preferably used for electrolyte membrane 502.

The liquid fuel is supplied from a fuel vessel (not shown) to anode 503 through liquid fuel chamber 510. Examples of the method for supplying the liquid fuel to liquid fuel chamber 510 include a method of allowing the liquid fuel to naturally drop from the fuel vessel, a method of drawing the liquid fuel from the fuel vessel into liquid fuel chamber 510 by the use of a porous material having capillary force, a supply method using a pressure difference produced by a pressure generation mechanism previously attached to the fuel vessel, a supply method using a pressure difference produced by a pressure generation mechanism installed in liquid fuel piping outside the fuel vessel, and a method including vaporizing the liquid fuel and supplying the vapor. The advantages of the invention can also be produced using any fuel supply method other than the above, as long as the supply method allows the liquid fuel to be supplied from the fuel vessel and to be in contact with the surface of anode 503. FIG. 12 shows an exemplary structure in which the liquid fuel is fed by gravity.

In the structure shown in FIG. 12, the exhaust gas generated at anode 503 is sucked from the side of holes 509 into separating layer 508 and allowed to move in the in-plane direction through the exhaust passage in separating layer 508 and discharged out of the fuel cell.

While separating layer 508 shown in FIG. 12 may be a liquid permeable membrane made of the same constituent material as that for separating layer 103 shown in FIG. 1, separating layer 508 preferably has sufficient water repellency in order to prevent the entry of the liquid fuel from regions other than the holes and preferably has, in its interior, exhaust passages of pores that are continuously formed in the in-plane direction to ensure the design efficiency of the exhaust gas discharge from the side of holes 509 of separating layer 508 through the interior of separating layer 508, although it is not limited with respect to stiffness. Examples of constituent materials with sufficient water repellency include sintered materials, foams or fabrics made of hydrophobic chemical fibers such as olefin resin, aromatic polyester resin or fluororesin fibers, and carbon cloth and carbon paper of carbon fibers whose surface is treated to be water repellent. For example, the olefin resin may be PP (polypropylene), PE (polyethylene) or the like, the aromatic polyester resin may be PET (polyethylene terephthalate) or the like, and the fluororesin may be PTFE (polytetrafluoroethylene) or the like. Sintered materials, foams or nonwoven fabrics of divided fibers/composite fibers of the above chemical fibers are also preferred. Inorganic materials such as ceramics are also preferably employed. The exhaust gas discharge efficiency can be higher in a case where the structure used can not only suck out the exhaust gas from the side of the holes to the exhaust passage of the separating layer but also discharge the exhaust gas from the anode surface to the interior of the separating layer than in a case where the exhaust gas is sucked out only from the side of the holes to the exhaust passage of the separating layer. Thus, the exhaust passage of the separating layer is more preferably formed by a three-dimensional network of pores, rather than formed to be aligned in the in-plane direction. Namely, it is more preferred that a large number of pores should also be present at the contact surface with the anode.

When a liquid permeable membrane is used as separating layer 508 like separating layer 103, separating layer 508 used preferably has continuous pores in the in-plane direction as exhaust passages in its interior such that the exhaust gas can be discharged from holes 509 through the interior of separating layer 508.

More frequent contact of the exhaust gas with the side of holes 509 of separating layer 508 facilitates the separation of the exhaust gas from the liquid fuel. Thus, the diameter of holes 509 is preferably as small as possible, as long as the liquid fuel can pass therethrough. In order to uniformly supply the liquid fuel, distances between holes 509 (for example, represented by pitch B in FIG. 13) are preferably equal to one another in the surface of anode 503. Alternatively, when the invention is applied to a fuel cell that produces a large current output during power generation and discharges a large amount of generated exhaust gas, the density of holes 509 is more preferably decreased in the direction of the discharge of the exhaust gas to the outside of the fuel cell or in the direction from the center of the fuel cell to its periphery. In this case, there can be provided a fuel cell that secures the exhaust gas passage well and has stable and high power generation characteristics.

The effects and advantages of the separating layer according to this embodiment are described in more detail below. Herein, the principal surface of the anode means a surface along which the exhaust gas is discharged out of the fuel cell, namely a surface on the side where an exhaust port or the like may be formed.

In FIGS. 14 to 18, the hollow arrow represents the traffic line of exhaust gas bubbles generated at the anode. The same elements as those in FIG. 12 are represented by the same reference marks as in FIG. 12, and the catalyst layer, the conductive layer and the electrolyte membrane are omitted.

Figure 14:
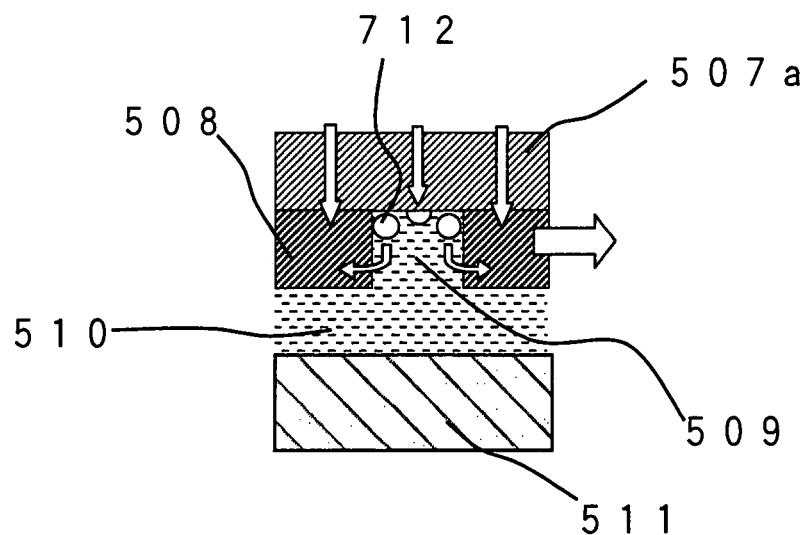
FIG. 14 is a cross-sectional view schematically illustrating the movement of exhaust gas generated at an anode during electric power generation in a case where the fuel cell of the invention is placed in such a manner that the anode is oriented downward in the vertical direction.
Figure 15:
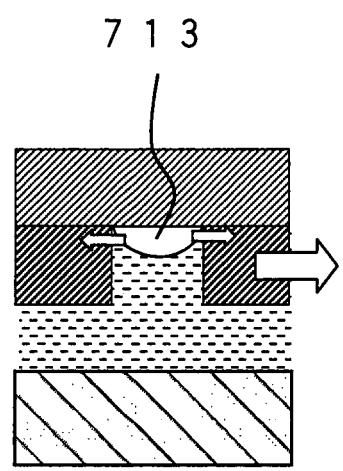
FIG. 15 is a cross-sectional view schematically illustrating the movement of exhaust gas after a certain period of time elapses from the state shown in FIG. 14.
Figure 18:
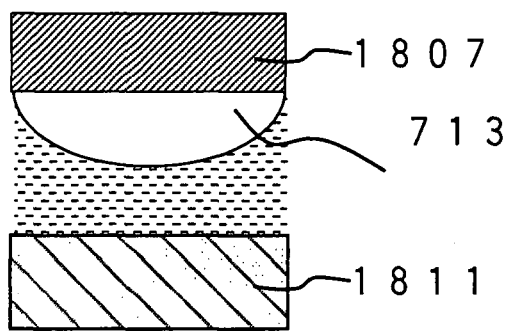
FIG. 18 is a cross-sectional view schematically illustrating the movement of exhaust gas generated at an anode during electric power generation in a case where a conventional fuel cell is placed in such a manner that the anode is oriented downward in the vertical direction.

When fuel cell 1200 is placed such that anode 503 is oriented downward in the vertical direction, as shown in FIG. 14, small bubbles 712 of exhaust gas apart from the surface of anode 503 outside holes 509 are separated by separating layer 508. Small bubbles 712 at the outlet of hole 509 are separated when they come into contact with separating layer 508 located on the side. If there is no separating layer between a porous substrate 1807 and a housing 1811 as shown in FIG. 18, bubbles 713 can keep on growing for a long period of time. If there is a separating layer, however, bubbles 713 that grow without coming into contact with the side of separating layer 508 can be sucked into separating layer 508 as shown in FIG. 15, when they come into contact with the side after the expiration of a certain period of time. Thus, the time period for which the hole is entirely covered with bubbles can be shorter in the arrangement shown in FIG. 14 than in the case where there is no separating layer as shown in FIG. 18.

Figure 16:
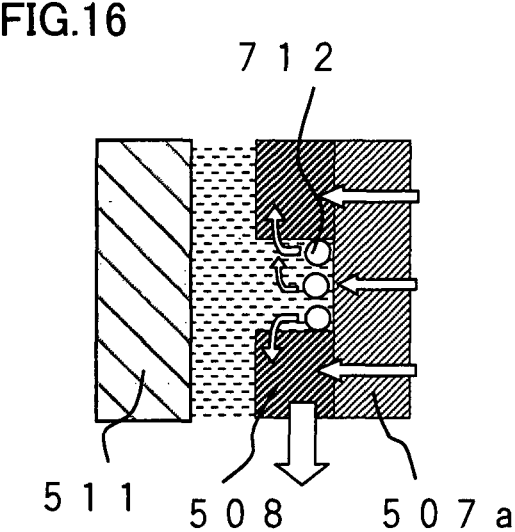
FIG. 16 is a cross-sectional view schematically illustrating the movement of exhaust gas generated at an anode during electric power generation in a case where the fuel cell of the invention is placed in such a manner that the principal face of the anode is oriented upward in the vertical direction.

On the other hand, when fuel cell 1200 is placed such that the principal surface of the anode is oriented upward in the vertical direction as shown in FIG. 16, bubbles 712 at the outlet of the hole is sucked into the separating layer located above due to buoyant force, so that the time period for which the hole is entirely covered with bubbles can be reduced.

Figure 17:
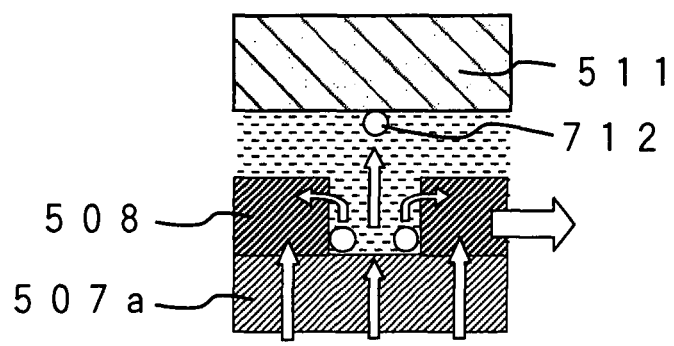
FIG. 17 is a cross-sectional view schematically illustrating the movement of exhaust gas generated at an anode during electric power generation in a case where the fuel cell of the invention is placed in such a manner that the anode is oriented upward in the vertical direction.

When fuel cell 1200 is placed such that the anode is oriented upward in the vertical direction as shown in FIG. 17, small bubbles 712 that exit from hole 509 without coming into contact with separating layer 508 can stay on the liquid surface side of housing 511 but do not interfere with the fuel supply from hole 509 to the anode surface. Bubbles growing on housing 511 do not interfere with the fuel supply, because they are sucked into separating layer 508 when the fuel cell is placed in the different direction or when the bubbles increase in size and partially come into contact with separating layer 508.

As described above, the separating layer may have a hole or holes that pass through in the layer thickness direction and form a part of the exhaust passage so that the exhaust gas can be drawn from the side of the hole or holes into the separating layer and discharged in the in-plane direction in the structure used. In such a case, stable and good power generation characteristics can be obtained regardless of the orientation of the fuel cell during operation.

In fuel cell 1200, cathode 504 includes cathode catalyst layer 505*b*, cathode conductive layer 506*b* and porous substrate 507*b* which are sequentially stacked on electrolyte membrane 502 like anode 503. Oxygen is supplied as an oxidizing agent from the air to cathode 504. The air supply method may be a method of exposing the cathode to the atmosphere, a method of supplying the air through a filter by means of an air blowing fan, an air blowing pump, or a compressor, or the like.

In a preferred mode of the invention, each of the anode and the cathode has a catalyst layer, an electrically-conductive layer and a porous substrate which are sequentially stacked on an electrolyte membrane and joined together, and the electrically-conductive layers of the anode and the cathode are each embedded in at least one of the porous substrate and the catalyst layer. Herein, the embedded state refers to a state where the electrically-conductive layer has an opening part and at least one of the porous substrate and the catalyst layer enters the opening part of the electrically-conductive layer. In a fuel cell having such a structure, the electrically-conductive layer can also function as a support for a composite of the electrode and the electrolyte membrane so that the dimensional stability of the fuel cell can be improved. When the catalyst layer enters the opening part of the electrically-conductive layer, the electrically-conductive layer can serve as a core in the catalyst layer so that the physical strength of the catalyst layer can be improved and that the catalyst layer can be formed thicker than a certain limit. In addition, the contact area between the electrically-conductive layer and the catalyst layer can be increased so that the contact resistance can be reduced. As the contact area increases, the adhesion also increases, so that peeling can be better prevented.

On the other hand, when the porous substrate enters the opening part of the electrically-conductive layer, the distance between the porous substrate and the catalyst layer is relatively short so that the liquid fuel and the emission product can be smoothly transferred between the porous substrate and the catalyst layer. FIG. 12 shows an example where anode conductive layer 506a of anode 503 is embedded in anode catalyst layer 505a and porous substrate 507a, and cathode conductive layer 506b of cathode 504 is embedded in cathode catalyst layer 505b and porous substrate 507b.

While FIG. 12 shows an example of the fuel cell having a porous substrate, structures without the porous substrate are also possible according to the invention. Specifically, according to the invention, the anode may be composed of the anode catalyst layer and the anode conductive layer, and the cathode may be composed of the cathode catalyst layer and the cathode conductive layer.

Concerning this embodiment, a description has been given of an example using separating layer 508 having holes 509 passing through in the layer thickness direction. Even when a porous substrate is laminated as in this embodiment, the liquid permeable membrane as described for Embodiment 1 may be used with no hole passing through in the layer thickness direction. In such a case, an exhaust passage may only be formed in the interior of the separating layer and/or at the interface between the separating layer and the porous substrate.

In fuel cell 1200, electrons produced by the power generation reaction at anode catalyst layer 505a are collected by anode conductive layer 506a and drawn out. When anode catalyst layer 505a is joined to anode conductive layer 506a, the electrical connection between catalyst layer 505a and anode conductive layer 506a can be well achieved even in a state where no external pressure is applied. The electrons drawn from anode conductive layer 506a to an external circuit are supplied to cathode catalyst layer 505b through cathode conductive layer 506b and used for the reaction. When cathode conductive layer 506b is joined to cathode catalyst layer 505b, the resistance value of the electrical connection between the electrically-conductive layer and the catalyst layer can be reduced similarly to the anode, so that the power generation efficiency can be improved. The technique without external pressure is also advantageous, because in the case of no external pressure, the in-plane pressure hardly varies so that stable power generation characteristics can be provided.

In order to apply the external pressure, some portions are pressed such that a pressure can be applied to the areas of anode catalyst layer 505a and cathode catalyst layer 505b, so that the supply of the fuel or air can be hindered. Therefore, the method without the application of the external pressure is also advantageous, because it does not inhibit the supply of the fuel or air and particularly because it allows a sufficient air supply.

Anode catalyst layer 505a, cathode catalyst layer 505b, anode conductive layer 506a, and cathode conductive layer 506b may be preferably the same in material and form as anode catalyst layer 105a, cathode catalyst layer 105b, anode conductive layer 104a, and cathode conductive layer 104b, respectively, and thus their description is not repeated here.

In the invention, porous substrate 507a or 507b is not necessarily an essential element. When the porous substrate is used, however, there is the advantage that an efficient fuel supply will be possible if capillarity is imparted to porous substrate 507a in anode 503. Herein, the term "porous" may be defined as having a porosity of 5% or more, preferably of 30% or more. For example, the porosity of the porous substrate may be calculated by a process that includes measuring the volume and mass of the porous substrate, and determining the specific gravity of the porous substrate, and determining the porosity from the specific gravity and the specific gravity of the constituent material itself according to the formula: porosity (%)=(1−(specific gravity of porous substrate/specific gravity of constituent material))×100.

For example, porous substrate 507a or 507b may be made of an electrically-conductive material such as a foam metal, sintered metal particles, a carbon form, and a ceramic form, or may be made of a non-electrically-conductive material such as a fiber bundle and a polymer form. Alternatively, a non-electrically-conductive porous substrate formed with an electrically-conductive layer that does not inhibit fluid permeation on the surface may be used. When porous substrate 507a or 507b used is electrically-conductive, porous substrate 507a may be allowed to serve as an aid for the collection of electrons from anode catalyst layer 505a of anode conductive layer 506a and for the electrical conduction in the in-plane direction, so that there can be provided the advantage that resistance loss can be reduced. Porous substrate 507b may also be allowed to serve as an aid for the supply of electrons to cathode catalyst layer 505b in cathode conductive layer 506b and for the electrical conduction in the in-plane direction, so that there can also be provided the advantage that resistance loss can be reduced. Porous substrate 507a or 507b may be made from a paste that is prepared by kneading at least an electrically-conductive powder and a binder as constituent materials.

The surface of porous substrate 507a or 507b is preferably made to have water repellency. If the surface of porous substrate 507a or 507b on the side in contact with anode conductive layer 506a and cathode conductive layer 506b has water repellency, the pores of porous substrate 507a or 507b can be prevented from being clogged by the liquid fuel or the like. This feature allows an efficient discharge of exhaust gas and an efficient supply of air in anode catalyst layer 505a and cathode catalyst layer 505b so that the effective catalyst area in the catalyst layer can be increased and that power generation characteristics can be improved. For example, water repellency may be imparted to the surface of the porous substrate by forming a PTFE-containing water-repellent layer or the like on the surface of the porous substrate.

As described above, separating layer 508 is preferably joined to the anode. The junction can maintain the short interface distance between separating layer 508 and the anode for a long period of time so that there can be provided a fuel cell having a separating structure that allows a stable separation and discharge of exhaust gas for a long period of time. In such a structure, if separating layer 508 and the anode are joined with an adhesive or the like applied to the whole of their interface, the discharge of exhaust gas can be hindered. Thus, it is more preferred that a hole-free portion of separating layer 508 should be joined to the anode at one or more points.

Embodiment 10

Figure 19:
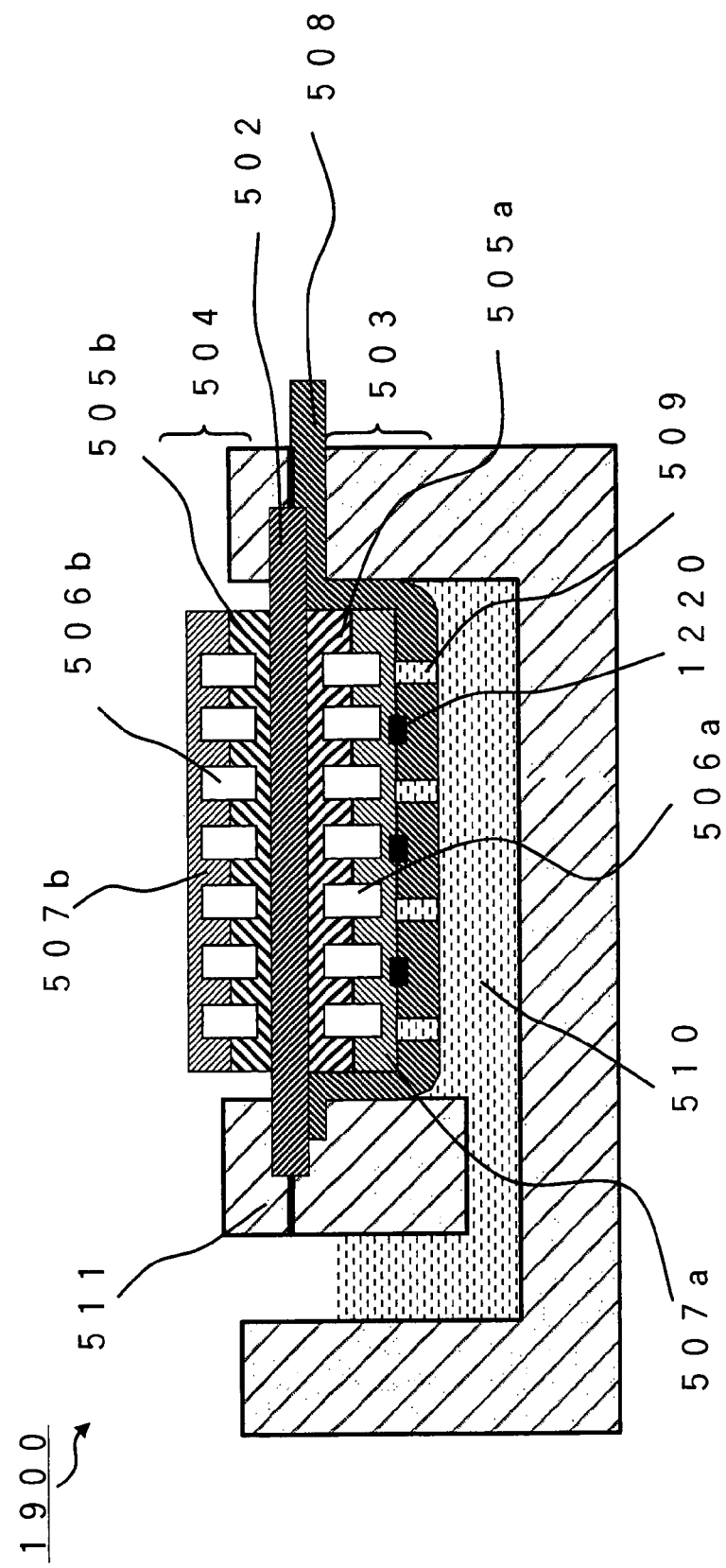
FIG. 19 is a cross-sectional view schematically showing another preferred structure of the fuel cell of the invention.

FIG. 19 shows a case where a hole-free portion of the separating layer is joined to the anode. In FIG. 19, parts having the same functions as those in FIG. 12 are represented by the same reference marks as in FIG. 12. In a fuel cell 1900 shown in FIG. 19, a hole-free portion of separating layer 508 is joined to porous substrate 507a of the anode with an adhesive layer 1220 interposed therebetween.

Figure 20:
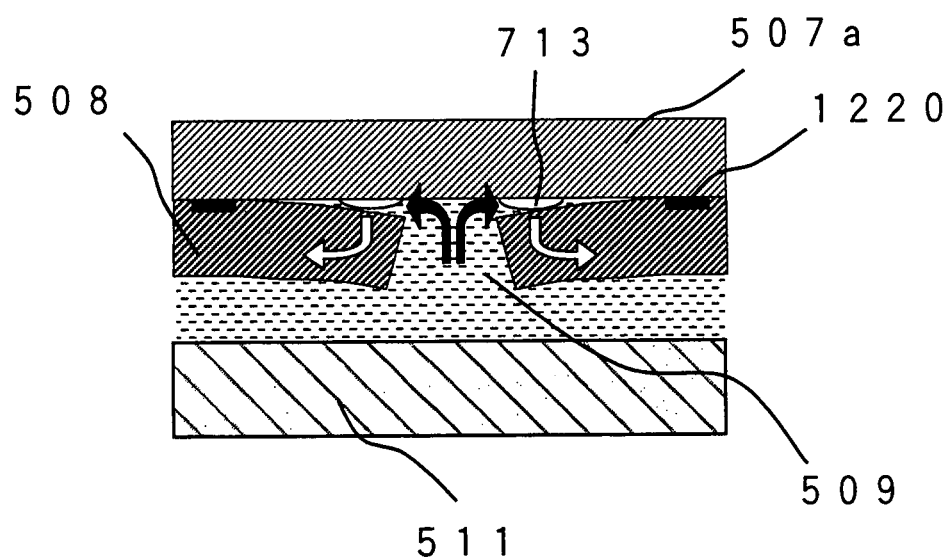
FIG. 20 is a cross-sectional view schematically illustrating the movement of bubbles 713 of exhaust gas generated at the anode during electric power generation and the movement of a liquid fuel in the fuel cell shown in FIG. 19.

In FIG. 20, the movement of exhaust gas is represented by the hollow arrow, while the movement of the liquid fuel is represented by the filled arrow. As shown in FIG. 20, also when the exhaust gas temporarily stays in a minute space formed at the interface between separating layer 508 and porous substrate 507a, grown bubbles 713 are sucked into separating layer 508 at the moment of contact with separating layer 508 so that a negative pressure can be generated and convection can occur to draw in the liquid fuel. This mechanism allows a more efficient fuel supply. In order to prevent the elution of ionic impurities or the like, adhesive layer 1220 preferably uses an adhesive mainly composed of an organic polymer in which a crosslinking agent, a plasticizer and the like do not use a metal-based additive or a sulfur compound or a non-volatile organic compound. For example, a heat-resistant and water-resistant adhesive mainly composed of a silicone resin, an epoxy resin, an olefin resin, a fluororesin, or the like is preferably used.

Embodiment 11

Figure 21:
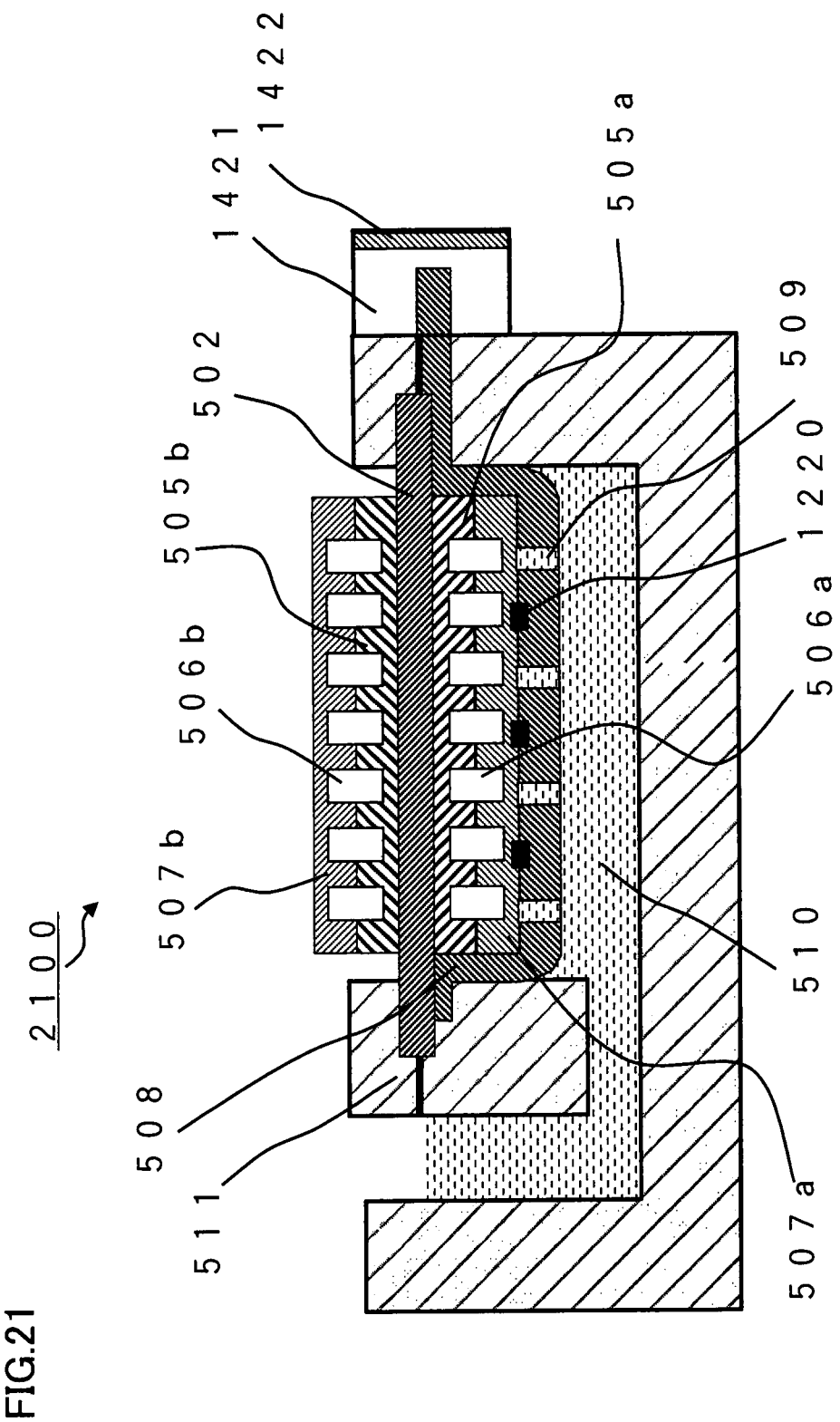
FIGS. 21 and 22 are cross-sectional views schematically showing other preferred structures according to the invention.

In FIG. 21, parts having the same functions as those in FIG. 12 are represented by the same reference marks as in FIG. 12. In a fuel cell 2100 shown in FIG. 21, one end of separating layer 508 is extended into a discharge chamber 1421, and the exhaust gas from the anode is discharged from discharge chamber 1421 to the outside of the fuel cell through an exhaust port 1422 that has a filter function to remove volatile organic substances. The pores for the exhaust gas discharge in the in-plane direction of separating layer 508 communicate with the atmosphere in discharge chamber 1421 so that the exhaust gas taken into separating layer 508 can be immediately transferred to discharge chamber 1421 through the pores by a pressure difference that is caused when the exhaust gas is generated. In this process, methanol vapor from the liquid fuel can also be taken into separating layer 508 and transferred to discharge chamber 1421. However, the methanol vapor is discharged from exhaust port 1422, which has a filter function to remove volatile organic substances, so that a gas-liquid separation structure with improved safety is provided. The fuel cell according to the invention is configured such that the exhaust gas generated at the anode is allowed to move in the in-plane direction and discharged out of the fuel cell. According to such a structure, therefore, there can be provided a thin fuel cell with a discharge chamber as compared with the structure in which the discharge is performed in the layer thickness direction.

Embodiment 12

While fuel cells using a cation exchange membrane as the electrolyte membrane have been described above, the invention has the same effect on fuel cells using an anion exchange membrane, particularly for alkaline direct alcohol fuel cells. For example, when methanol is used as a fuel in alkaline fuel cells using an anion exchange membrane, electric power generation is performed according to the following reactions:
Anode: $CH_3OH + 6OH^- \rightarrow CO_2 + 5H_2O + 6e^-$
Cathode: $3/2 O_2 + 3H_2O + 6e^- \rightarrow 6OH^-$ In a methanol fuel cell using an anion exchange membrane, the fuel comes into contact with the anode to react with hydroxide ions so that carbon dioxide and water are produced. At the cathode, oxygen and water react to form hydroxide ions, which are transferred to the anode through the anion exchange membrane. In this process, electrons pass through an external load and move from the anode to the cathode and are taken out as electric power.

In this process, carbon dioxide generated at the anode undergoes the reaction below with hydroxide ions so that carbonate ions are produced.

$$CO_2 + 2OH^- \rightarrow CO_3^{2-} + H_2O \qquad \text{Reaction 1}$$

Fuel cells using anion exchange membranes have a problem in which the anode can have a reduced pH in the above reaction so that the alcohol oxidation activity of the anode can be reduced, or the produced carbonate ions can degrade the electrolyte membrane. According to the invention, carbon dioxide gas is efficiently discharged out of the anode, and thus the progress of Reaction 1 can be slowed, so that the problem of the reduction in alcohol oxidation activity or the degradation of the electrolyte membrane can be reduced.

In addition, the exhaust gas generated at the anode does not pass through the liquid fuel with a high concentration and is discharged in the in-plane direction from the separating layer. Thus, the distance of contact with the high concentration liquid fuel can be shorter than that in the case where the discharge is performed in the layer thickness direction, and the amount of dissolution of carbon dioxide in the liquid fuel can be reduced, so that the degradation can be reduced.

Embodiment 13

Figure 22:
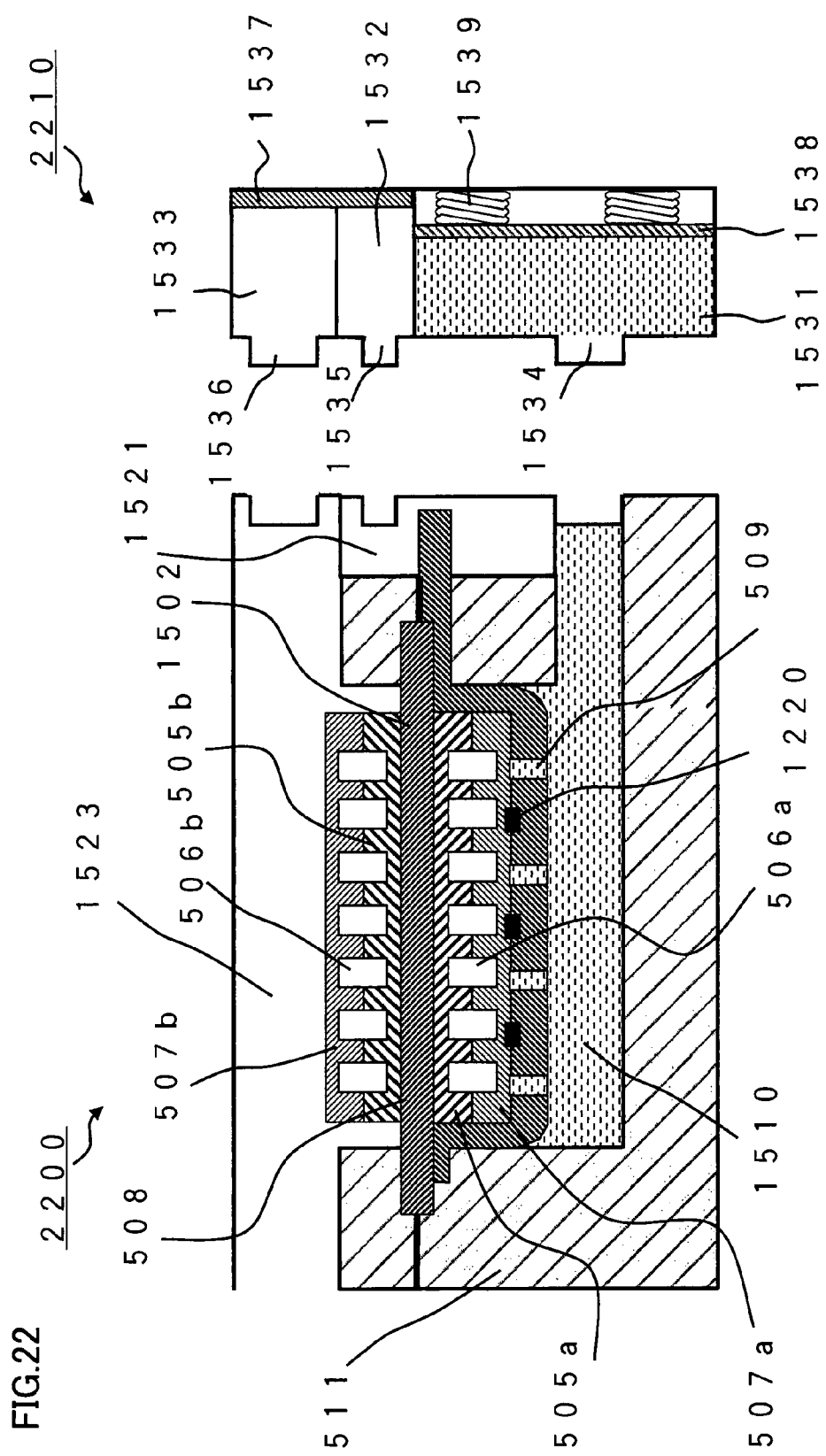

A fuel cell 2200 includes a liquid fuel chamber 1510, a discharge chamber 1521, and an air chamber 1523, which are configured to be connected, respectively, to a fuel chamber 1531 for an anode, a discharge chamber 1532 for an anode and a discharge chamber 1533 for a cathode via connectors 1534, 1535 and 1536 formed in a cartridge 2210. In FIG. 22, the same constituents as those in FIG. 12 are represented by the same reference marks as in FIG. 12. FIG. 22 shows a case where fuel cell 2200 uses an anion exchange membrane as an electrolyte membrane 1502. Male and female connectors are not limited to those shown in FIG. 22, and any combination may be used.

The air taken in from the atmosphere is allowed to react at the cathode and then discharged to discharge chamber 1533 for the cathode to produce a cathode exhaust gas. After methanol is allowed to react at the anode, the generated exhaust gas and the vapor from the liquid fuel are discharged to discharge chamber 1532 for the anode to produce an anode exhaust gas. The cathode exhaust gas and the anode exhaust gas are both preferably discharged to the outside through an exhaust port 1537 that has a filter function to remove volatile organic substances. The location of exhaust port 1537 may be appropriately designed so as not to cause discomfort to users, and the exhaust gas may be guided to exhaust port 1537. In view of design, one exhaust port 1537 may be provided as shown in FIG. 22, and the exhaust port of discharge chamber 1532 for the anode may be configured to also serve as the exhaust port of discharge chamber 1533 for the cathode.

It is known that due to the crossover, oxidation proceeds between methanol passing through electrolyte membrane 1502 and oxygen at the cathode, and in this process, formaldehyde or formic acid is produced as an intermediate product in the discharged air from the cathode. Using the structure of the invention, however, the exhaust gas to be discharged out of fuel cell 2200 is entirely allowed to pass through the filter so that the volatile organic substances are removed, and thus a fuel cell with improved safety can be provided. Cartridge 2210 may also be provided with a volatile organic substance-removing filter. In such a case, the cartridge and the filter may be replaced at the same time, so that the safety can be ensured for a long period of time. A non-return mechanism may be provided in connectors 1535 and 1536 such that the exhaust gas does not return from discharge chamber 1532 for the anode and discharge chamber 1533 for the cathode to discharge chamber 1521 and air chamber 1523, respectively. In such a case, a single chamber may serve as both discharge chambers 1532 and 1533 for the fuel and cathodes. This simplifies the elements of the discharge chamber in cartridge 2210 so that the size and cost of cartridge 2210 can be reduced.

For example, the liquid fuel in fuel chamber 1531 for the anode may be pushed out to liquid fuel chamber 1510 by the movement of a movable plate 1538 to which a pressure generated by a pressure mechanism 1539 composed of a spring and the like is applied. The pressure mechanism is not limited to the above means, and a vaporization pressure produced with liquefied gas such as butane may also be used.

The liquid fuel charged into the anode is not only used for the reaction but also consumed while it passes from the anode to the cathode through electrolyte membrane 1502. The concentration of the liquid fuel in cartridge 2210 is preferably such that the ratio of fuel/water can be set at (M1+M2)/(W1+W2), wherein M1 represents the total amount of the fuel consumed by the reaction at the anode for a certain period of time, M2 represents the total amount of the fuel passing through the electrolyte membrane, W1 represents the total amount of water consumed by the reaction, and W2 represents the total amount of water passing through the electrolyte membrane. In this case, as the reaction proceeds, one of water and the liquid fuel can remain in a large amount at the anode, and thus the other can be supplied only by diffusion, so that the reaction at the anode can be prevented from being limited to the fuel supply rate controlling.

Embodiment 14

Figure 23:
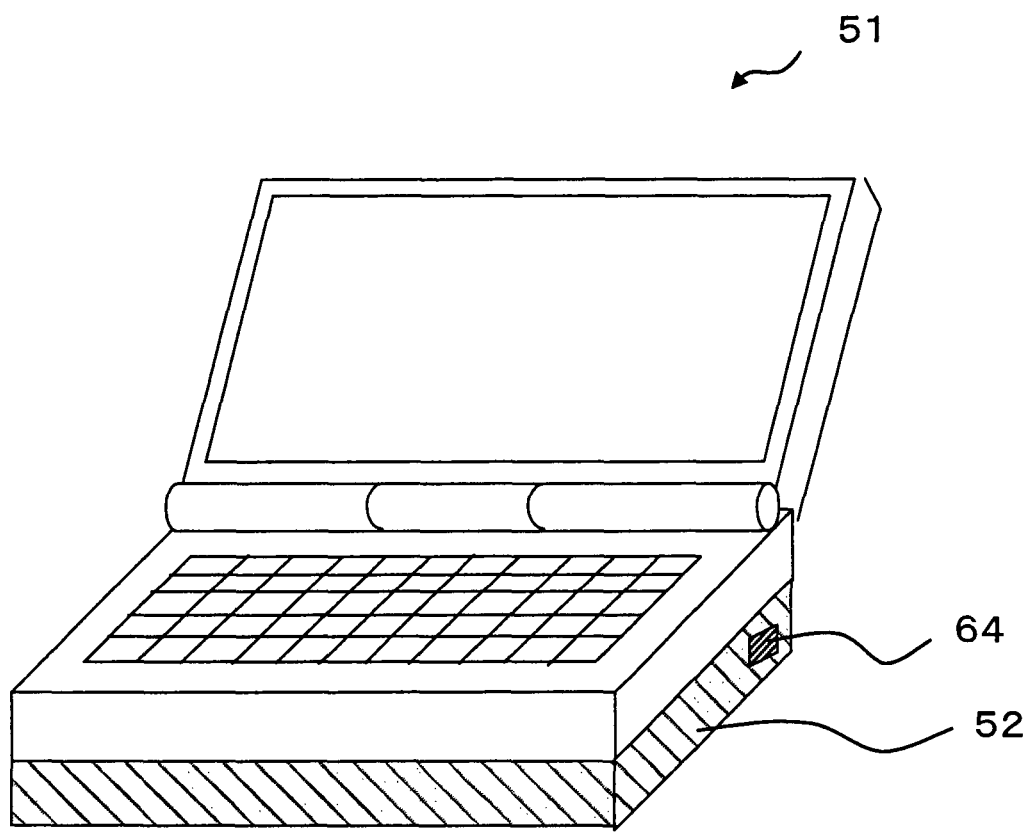
FIG. 23 is a diagram schematically showing an exemplary structure of the electronic device of the invention.

The invention also provides an electronic device equipped with the above-described fuel cell or fuel cell system. In an electronic device 51 shown in FIGS. 23 and 24, a fuel cell system 52 typically includes a fuel cell 50, a liquid fuel tank 53, a DC/DC converter 54, a control circuit 55, a secondary cell 56, and a charge control circuit 57. While liquid fuel tank 53 is included as an element of the fuel cell system in FIG. 24, it may be attached as an option to the exterior of the fuel cell system.

The fuel cell takes in a liquid fuel from liquid fuel tank 53 and air or oxygen from the atmosphere, respectively, to generate electric power. Carbon dioxide produced during the power generation and air (as an exhaust gas) are discharged from an exhaust port 64 to the outside of the fuel cell system through a volatile organic substance-removing filter. A voltage output from fuel cell 50 is increased or decreased to the desired voltage for the electronic device load by DC/DC converter 54. Fuel cell 50 is also serially electrically connected to an electronic device load 58. In the configuration of fuel cell system 52 shown in FIG. 24, diodes 59 and 60 prevent current backflow, and thus a hybrid control system is configured such that a larger current is fed from the secondary cell side when the voltage of secondary cell 56 is higher than a fuel cell voltage at the time of power generation. Alternatively, secondary cell 56 may be replaced with a capacitor. A secondary cell (not shown) installed in electronic device 51 may also be used in place of secondary cell 56.

Figure 24:
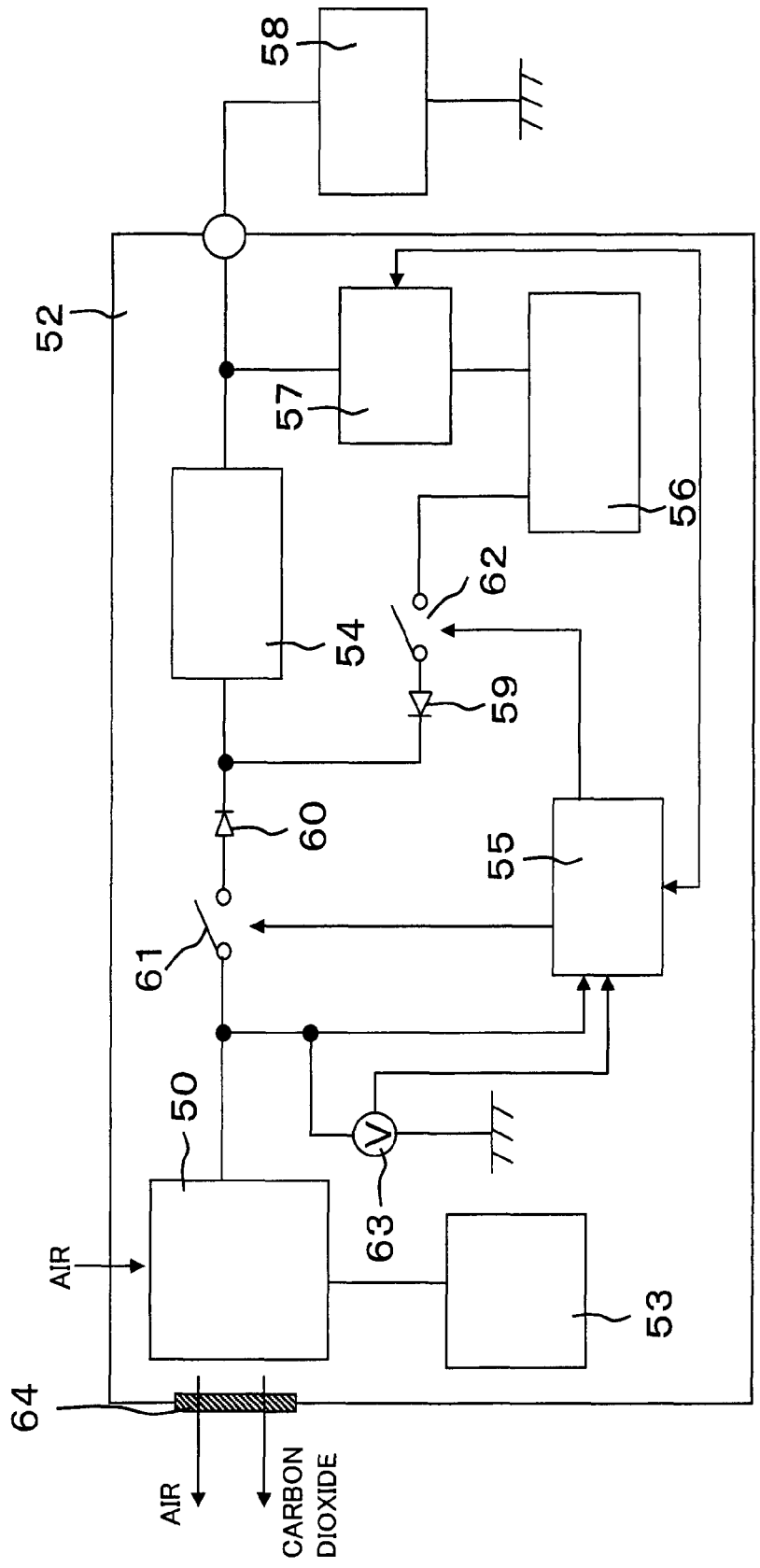
FIG. 24 is a block diagram illustrating an exemplary configuration of the electronic device of the invention.

In the configuration shown in FIG. 24, the voltage of fuel cell 50 is detected by a fuel cell voltage detector 63 during power generation, and when the detected voltage of fuel cell 50 falls blow a specified threshold value (such as at the time of pulsed peak current), a switch 61 is turned off and a switch 62 is turned on so that output compensation control can be performed with the secondary cell or the capacitor. Charge control circuit 57 controls the secondary cell charging while detecting the remaining charge of secondary cell 56. Fuel cell 50 generally has an output voltage of 1 V or less per single cell. In order to obtain a desired voltage, therefore, it is preferred that single cells should be serially electrically connected.

EXAMPLES

The invention is described in more detail with the examples below, which are not intended to limit the scope of the invention.

Preparation of Fuel Cell 1

Nafion (registered trademark) 117 (manufactured by DuPont) in a size of 40×40 mm with a thickness of about 175 µm was used as an electrolyte membrane.

Catalyst pastes were prepared by the following procedure. Catalyst-supporting carbon particles (TEC66E50, manufactured by Tanaka Kikinzoku Kogyo) that were composed of Pt particles, Ru particles and carbon particles and had a Pt content of 32.5 wt % and a Ru content of 16.9 wt %, an alcohol solution of 20 wt % Nafion (manufactured by Aldrich), isopropanol, and zirconia ball were added in a specific ratio to a PTFE vessel and mixed with an agitator at 500 rpm for 50 minutes to form an anode catalyst paste. Catalyst-supporting carbon particles (TEC10E50E, manufactured by Tanaka Kikinzoku Kogyo) that was composed of Pt particles and carbon particles and had a Pt content of 46.8 wt % was used to form a cathode catalyst paste under the same conditions as those for the anode catalyst paste.

The anode catalyst paste was applied to the center of Nafion 117 with a screen printing plate having a 23×23 mm window in such a manner that the catalyst was supported in an amount of 2 mg/cm$^2$ on one side of the electrolyte membrane Nafion 117. The coating was then dried at room temperature to form an about 30 µm-thick anode catalyst layer.

The anode catalyst paste was applied to the center of the other side of Nafion 117 by the same screen printing method in such a manner that the catalyst was supported in an amount of 3 mg/cm$^2$ at a position overlapping the anode catalyst layer, and dried at room temperature to form an about 20 µm-thick cathode catalyst layer. Hereinafter, the product having the anode catalyst layer and the cathode catalyst layer formed on Nation 117 is referred to as CCM (Catalyst Coated Membrane).

A 23×50 mm-size cut piece of a 100-mesh gold mesh (manufactured by The Nilaco Corporation) with a wire diameter of 70 µmϕ was used as a porous anode conductive layer (corresponding to the anode conductive layer according to the invention) and as a porous cathode conductive layer (corresponding to the cathode conductive layer according to the invention). Hereinafter, the gold mesh for the porous anode conductive layer is referred to as "anode gold mesh," while the gold mesh for the porous cathode conductive layer is referred to as "cathode gold mesh."

A 23×23 mm-size cut piece of carbon paper having a water-repellent treated layer on one side (BC31 manufactured by SGL Carbon) was used as a porous layer (corresponding to the porous substrate according to the invention).

Nafion 117 (manufactured by DuPont) in a size of 40×40 mm with a thickness of about 175 µm was used as a liquid permeable membrane (corresponding to the separating layer according to the invention).

The edge portion of the cathode gold mesh and the edge portion of the carbon paper were aligned in such a manner that the cathode gold mesh and the water-repellent treated layer side of the carbon paper overlapped one another, and press bonding was performed with a pressing machine under a load of 1 t for 1 minute so that the carbon paper was temporarily bonded to the cathode gold mesh.

The carbon paper temporarily bonded to the cathode gold mesh was directed downward, and the cathode catalyst layer side of the CCM and the edge portion of the cathode gold mesh were aligned and stacked, on which the anode catalyst layer of the CCM and the edge portion of the anode gold mesh were aligned and stacked. The edge portion of the CCM and the edge portion of Nafion 117 were further aligned and stacked thereon. In this process, the cathode gold mesh and the anode gold mesh were superposed in such a manner that they protruded from the CCM in different directions.

While all the components were aligned and stacked, a 600 µm stainless steel spacer was placed around the periphery of the CCM, and a hot pressing process was performed at 130° C. and 8 kN for 2 minutes, so that all the components were integrally formed into a membrane electrode assembly.

An acrylic plate in a size of 60×60 mm and with a thickness of 10 mm was used, and a liquid fuel chamber was formed by cutting its central portion in a size of 23×23 mm and with a depth of 5 mm. The resulting acrylic cell was used as an anode housing. A hole with a diameter of 1 mm was also formed at the center of the acrylic plate by drilling so as to communicate with the recessed portion. A 23×23 mm portion of an acrylic plate in a size of 60×60 mm with a thickness of 5 mm was completely hollowed out by cutting, and the resulting acrylic cell was used as a cathode housing. Hereinafter, the acrylic cell for the anode housing is referred to as the anode acrylic cell, while the acrylic cell for the cathode housing is referred to as the cathode acrylic cell.

The liquid permeable membrane of Nafion 117 was placed in contact with the anode acrylic cell, and the cathode housing was stacked thereon such that their centers coincide with one another. Their peripheral portions were then held down so that Fuel Cell 1 (corresponding to the fuel cell of the invention) was prepared.

Preparation of Fuel Cell 2

Fuel Cell 2 was prepared as a comparative example using the method for Fuel Cell 1, except that the liquid permeable membrane of Nafion 117 was not used.

Example 1

A loading device was electrically connected to the anode gold mesh and the cathode gold mesh each extending from the interface between the anode acrylic cell and the cathode acrylic cell of Fuel Cell 1 to the outside thereof. About 2.5 ml of an aqueous methanol solution with a concentration of 3 mol/L was injected with a syringe through the 1 mm-diameter hole formed in the anode acrylic cell, and 10 minutes later, the power generation characteristics were evaluated at room temperature.

Comparative Example 1

The power generation characteristics were evaluated using the method of Example 1, except that Fuel Cell 2 was used instead.

In Example 1, no contamination of the aqueous methanol solution (the liquid fuel) with bubbles was observed during the time period of power generation, and it was demonstrated that Nafion 117 allowed only the aqueous methanol solution to pass therethrough and did not allow carbon dioxide (exhaust gas) to pass therethrough. When soap water was sprayed on the side of the acrylic cell where the anode gold mesh was allowed to extend to the outside of the fuel cell, the generation of bubbles was observed so that it was demonstrated that carbon dioxide was discharged out of the fuel cell. After the soap water was wiped, the evaluation of the power generation characteristics was continued. As a result, no discharge of the aqueous methanol solution to the outside of the fuel cell was observed, and it was demonstrated that no leakage of the liquid fuel to the outside of the fuel cell occurred.

In Comparative Example 1, the contamination of the aqueous methanol solution with bubbles was observed during the time period of power generation, and the leakage of the aqueous methanol solution from the 1 mm-diameter hole (through which the aqueous methanol solution was injected) was also observed.

Figure 25:
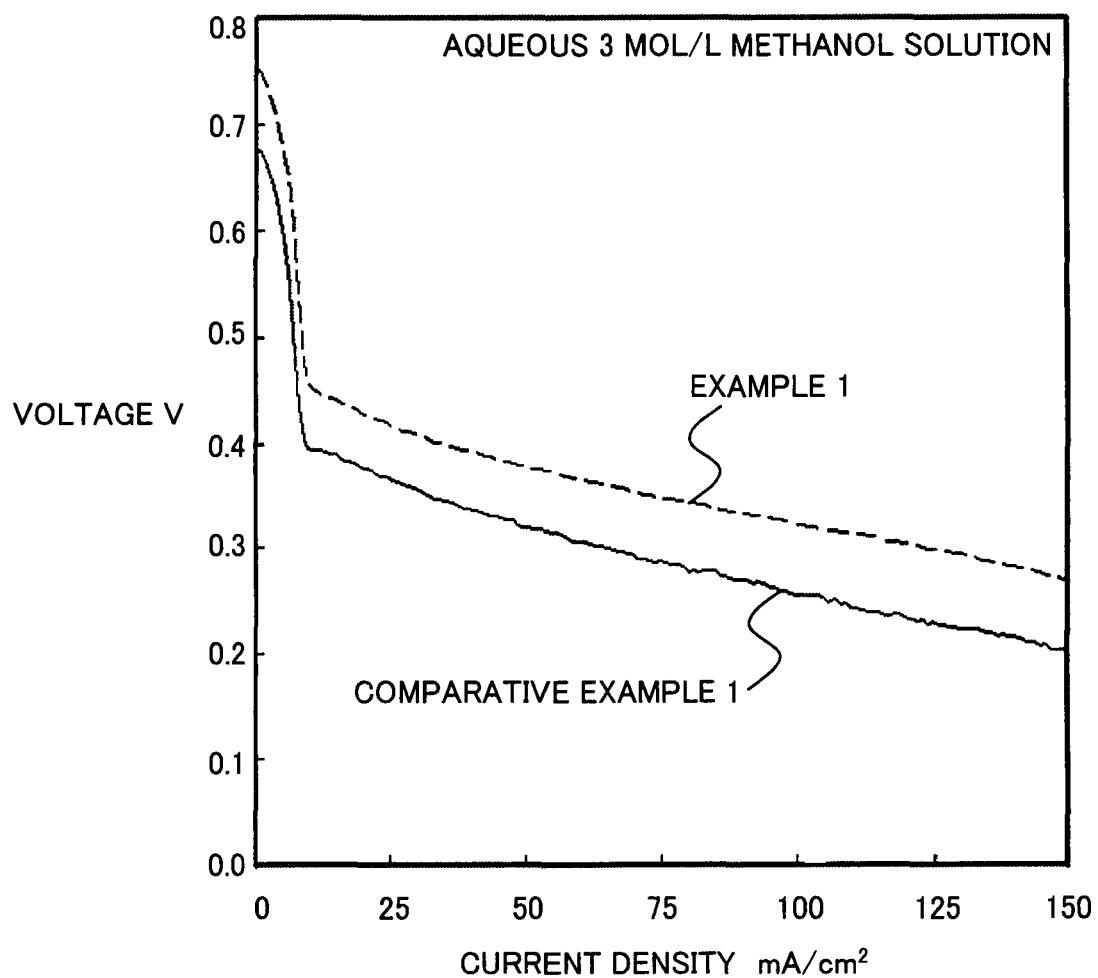
FIG. 25 is a graph showing current-voltage characteristics obtained by electric power generation in Example 1 and Comparative Example 1.

From the result shown in FIG. 25, it was demonstrated that the open circuit voltage was higher in Fuel Cell 1 used in Example 1 than in Fuel Cell 2 used in Comparative Example 1 and that the use of the liquid permeable membrane as a separating layer increased the open circuit voltage. This is probably because the amount of the supply of methanol is limited by the liquid permeable membrane, and the liquid fuel in the anode catalyst layer is kept at a low concentration, so that the methanol crossover is suppressed.

Example 2

The power generation characteristics were evaluated using the method of Example 1, except that the concentration of the aqueous methanol solution was set at 5 mol/L.

Comparative Example 2

The power generation characteristics were evaluated using the method of Comparative Example 1, except that the concentration of the aqueous methanol solution was set at 5 mol/L.

Figure 26:
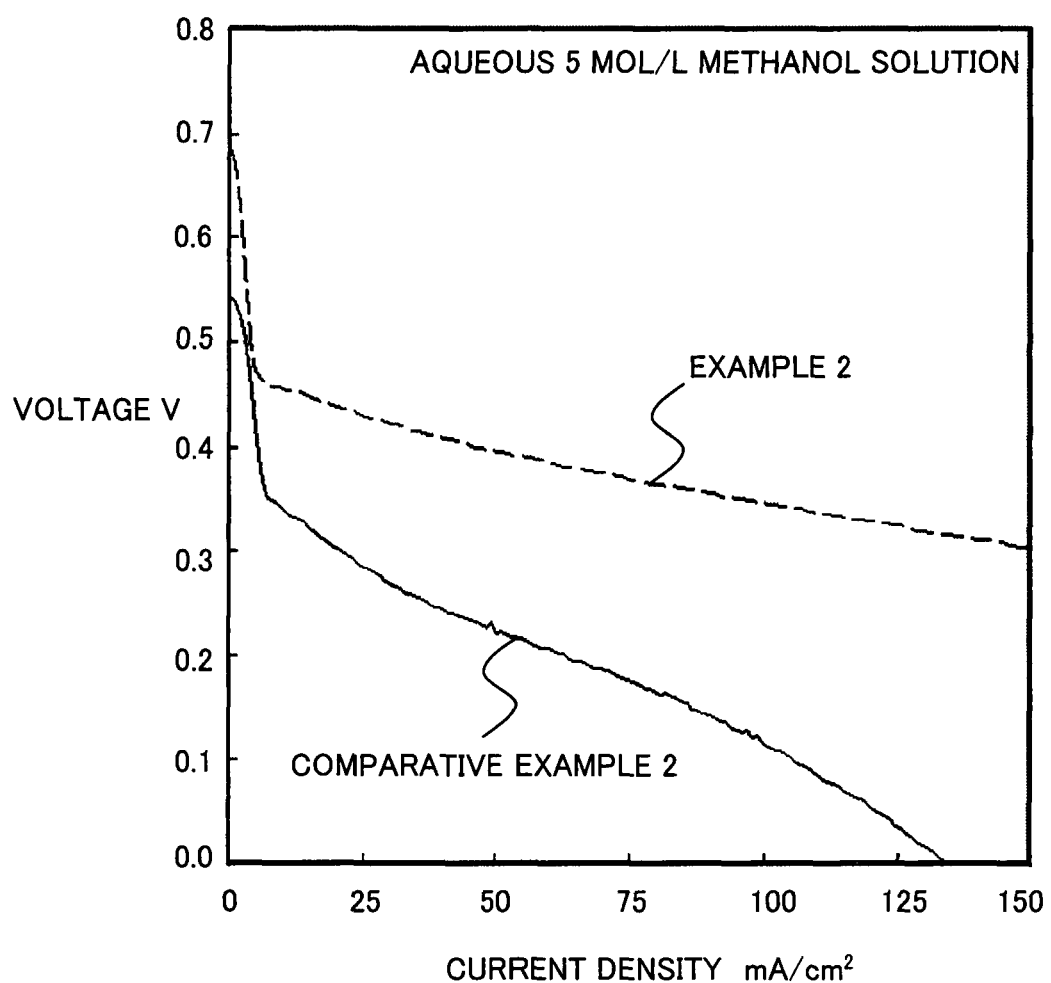
FIG. 26 is a graph showing current-voltage characteristics obtained by electric power generation in Example 2 and Comparative Example 2.
Figure 27:
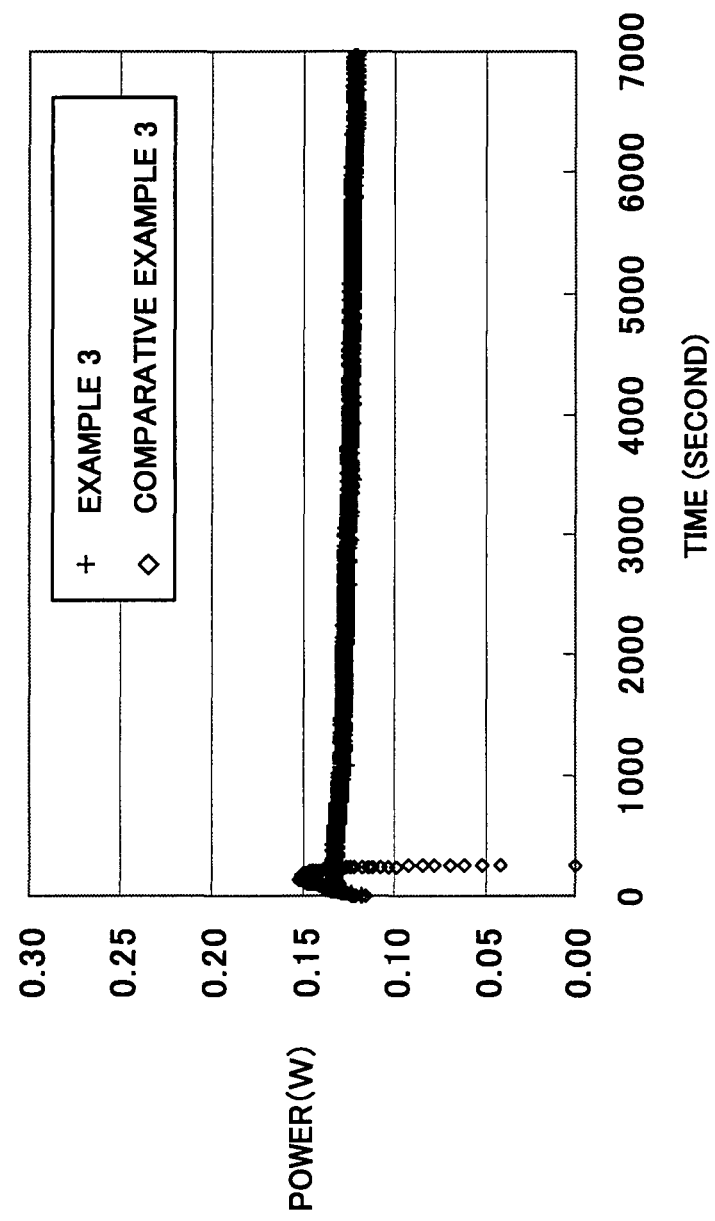
FIG. 27 is a graph showing time-power characteristics obtained by electric power generation in Example 3 and Comparative Example 3.

From the result shown in FIG. 26, it was demonstrated that even when an aqueous methanol solution with a high concentration was used, the use of the liquid permeable membrane as a separating layer increased the open circuit voltage.

From these results, it is apparent that the fuel cell of the invention using a liquid permeable membrane as a separating layer can produce good power generation characteristics even when a high concentration liquid fuel is used.

Preparation of Fuel Cell 3

Carbon Paper with a thickness of 0.32 mm (GDL31BC, manufactured by SGL Carbon) was used as a porous substrate for an anode and a cathode. A 0.07φ, 100-mesh Au mesh (manufactured by The Nilaco Corporation) was used as an anode conductive layer and as a cathode conductive layer. A combination of the porous substrate and the anode conductive layer and a combination of the porous substrate and the cathode conductive layer were each pressed under a pressure of 10 kgf/cm$^2$ for 10 seconds so that electrode substrates each having the conductive layer embedded and fixed in the porous substrate were prepared.

A 46.5 wt % platinum (1:1 platinum:ruthenium on the anode side)-supporting carbon catalyst (manufactured by Tanaka Kikinzoku Kogyo) (hereinafter also referred to as Pt/C), a 20 wt % Nafion (registered trademark) solution (manufactured by Aldrich), and isopropanol were mixed in such a manner that the amounts of Pt/C, Nafion (registered trademark) and the organic solvent were adjusted to 2 mg Pt/cm$^2$, 1.0 mg/cm$^2$, and 60 mg/cm$^2$, respectively, with respect to the electrode area, and stirred with zirconia beads at 500 rpm for 50 minutes in a stirring mill to form a slurry. The slurry was applied by a screen printing method to an area of 5 cm$^2$ on the surface where each conductive layer of the electrode substrate was fixed, and then the solvent was removed by drying at room temperature, so that each of the anode catalyst layer and the cathode catalyst layer was formed.

The electrode substrates each having the catalyst layer were hot-pressed against both sides of a 175 μm-thick Nafion membrane (manufactured by DuPont) (an electrolyte membrane), respectively, at a temperature of 135° C. under a pressure of 10 kgf/cm² for 5 minutes (preheating for 2 minutes and pressing for 3 minutes) to form a membrane electrode assembly.

Figure 13:
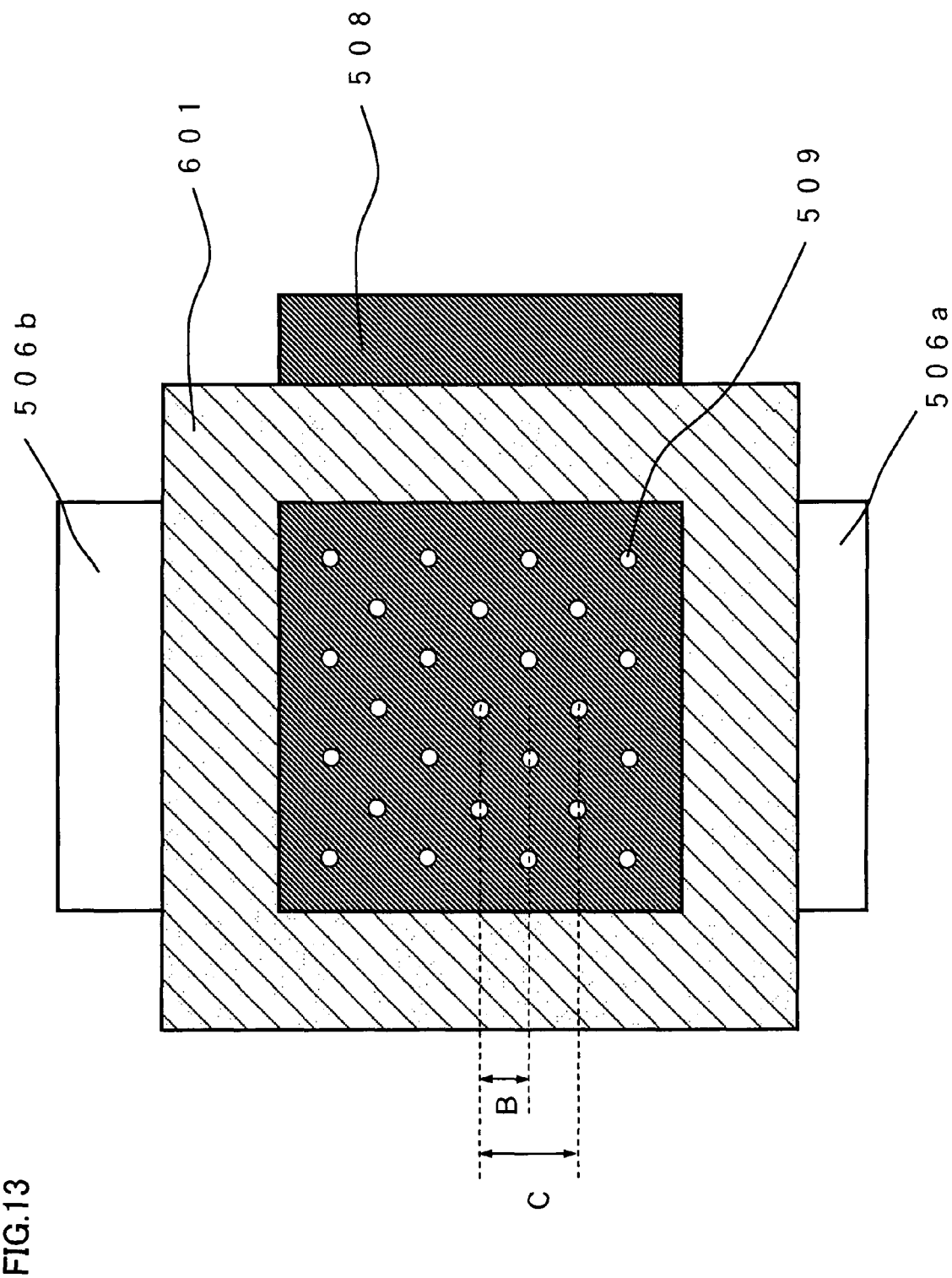
FIG. 13 is a diagram showing the VI-VI cross section of a fuel cell 1200 shown in FIG. 12.

A continuous long-fiber nonwoven fabric 601 Haibon spunbond (manufactured by Shinwa Corp.) produced with polypropylene was used, and 25 evenly spaced holes (in total) each with a diameter of 1 mm were formed therein with a punch as shown in FIG. 13 with a space B of 3 mm and a space C of 6 mm so that a separating layer was obtained.

As shown in FIG. 12, the acrylic housing was placed in such a manner that the anode side surface of the membrane electrode assembly was entirely immersed in the fuel, and the cathode side was exposed to the atmosphere, so that a fuel cell was prepared. An acrylic housing having a hole with an area slightly larger than the catalyst layer was used, and the fuel vessel and the periphery of the power generation part on the anode side of the membrane electrode assembly were bonded to each other in such a manner that the center of the hole and the center of the catalyst layer on the anode side of the membrane electrode assembly coincided with each other. Sealing was then performed to prevent the liquid fuel from leaking. Sealing was carefully performed so as not to fill up the pores of the separating layer, and it was ensured that one end of the separating layer formed was exposed to the air. As a result of the above method, Fuel Cell 3 of the invention was prepared.

Preparation of Fuel Cell 4

Fuel Cell 4 was prepared using the method for Fuel Cell 3, except that the separating layer of the anode was not formed.

Example 3

The power generation characteristics were evaluated using the Fuel Cell 3. The measurement conditions were a room temperature of 25° C. and a humidity of 60%, and an aqueous 3 M methanol solution was used as a liquid fuel. The anode was placed below the electrolyte membrane in the vertical direction, and power generation was performed under a load of 0.1 A/cm².

Comparative Example 3

The power generation characteristics were evaluated using the method of Example 3, except that Fuel Cell 4 was used instead.

A comparison between the result of Example 3 using Fuel Cell 3 according to the invention and the result of Comparative Example 3 using Fuel Cell 4 with no separating layer indicates that the fuel cell having the separating layer according to the invention is superior in terms of long-term stability.

Example 4

The power generation conditions were the same as those in Example 3, except that Fuel Cell 3 was placed in the vertical direction. An electrochemical analyzer (PGSTAT30, manufactured by Autolab) was used under the conditions of measuring frequencies from 50 mHz to 10 kHz and an alternating current amplitude of ±10 mA/cm² to perform the analysis of the AC impedance of the whole of the fuel cell, and a Cole-Cole plot under the load condition of a current density of 100 mA/cm² was obtained.

Comparative Example 4

The power generation characteristics were evaluated under the same conditions as those in Example 4, except that Fuel Cell 4 was used instead.

Figure 28:
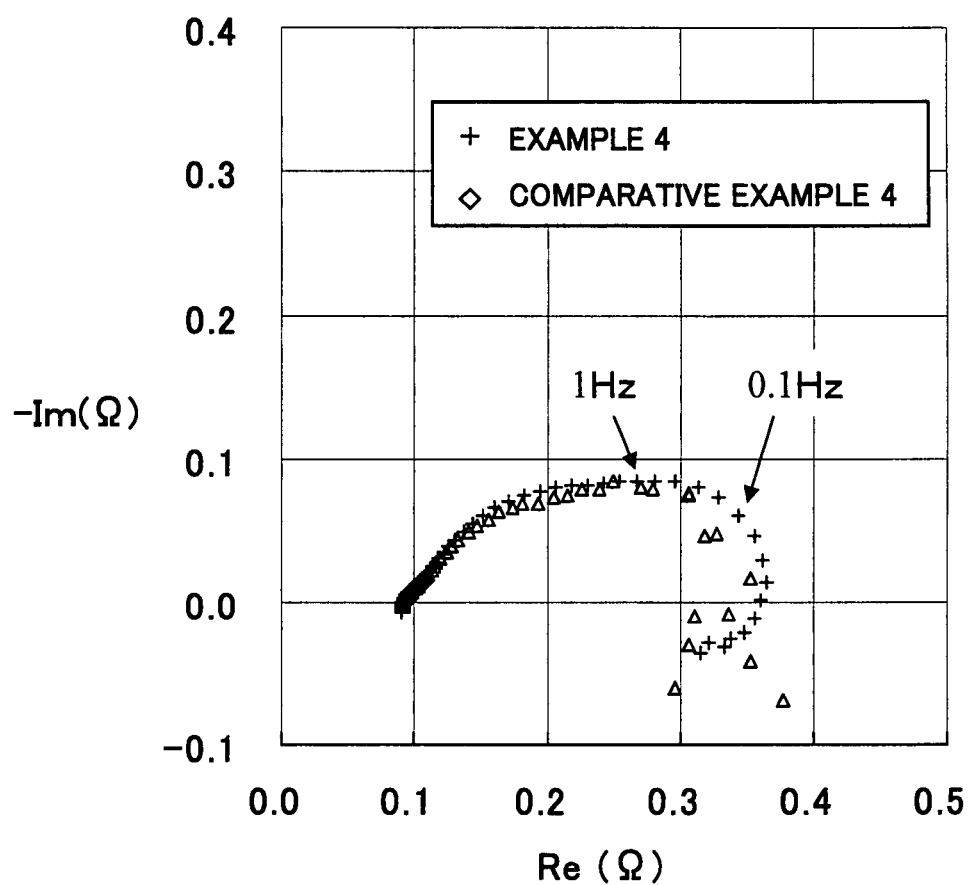
FIG. 28 is a graph showing Cole-Cole plots obtained by electric power generation in Example 4 and Comparative Example 4.

As is evident from a comparison between Example 4 and Comparative Example 4 shown in FIG. 28, the result of Example 4 with the separating layer shows that fluctuations are reduced in the low frequency region of 1 Hz or less. Thus, it has been found that the fuel cell having the separating layer according to the invention has good fuel supply stability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A fuel cell, comprising at least:
an electrolyte membrane;
an anode formed on one surface of said electrolyte membrane;
a cathode formed on another surface of said electrolyte membrane;
a liquid fuel chamber for supplying a liquid fuel to said anode; and
a separating layer formed between said anode and said liquid fuel chamber;
wherein
said anode comprises at least an anode catalyst layer;
said separating layer is formed in contact with said anode catalyst layer;
at least one selected from the group consisting of said separating layer and said anode having an exhaust passage that is continuously formed in an in-plane direction to discharge exhaust gas generated at said anode;
said separating layer being a polymer membrane and allowing said liquid fuel to pass from said liquid fuel chamber to said anode and blocking the movement of gas from said anode to said liquid fuel chamber; and
a route for supplying the liquid fuel to the anode is separated from the exhaust passage to discharge exhaust gas.

2. The fuel cell according to claim 1, wherein said separating layer allows said liquid fuel to pass through by permeation and diffusion.

3. The fuel cell according to claim 1, wherein said separating layer is a porous layer.

4. The fuel cell according to claim 1, wherein said separating layer is a solid polymer electrolyte membrane.

5. The fuel cell according to claim 4, wherein said solid polymer electrolyte membrane is a hydrocarbon-based solid polymer electrolyte membrane.

6. The fuel cell according to claim 5, wherein said hydrocarbon-based solid polymer electrolyte membrane comprises at least one solid polymer electrolyte selected from the group consisting of sulfonated polyimide, sulfonated polyetheretherketone, sulfonated polyarylene ether, and sulfonated polystyrene.

7. The fuel cell according to claim 1, wherein
said anode comprises at least an anode catalyst layer and an anode conductive layer,
said separating layer is formed in contact with said anode, and
said anode conductive layer has a continuous hole being continuous in its layer thickness direction.

8. The fuel cell according to claim 7, wherein irregularities are formed on a surface of said anode conductive layer.

9. The fuel cell according to claim 7, wherein said anode conductive layer is a porous metal layer.

10. The fuel cell according to claim 9, wherein said porous metal layer is at least one selected from the group consisting of a metal mesh, a metal foam and a sintered metal material.

11. The fuel cell according to claim 7, wherein at least one from the group consisting of said anode catalyst layer and said anode conductive layer is joined to said separating layer.

12. The fuel cell according to claim 1, wherein
    said anode comprises an anode catalyst layer, an anode conductive layer and a porous substrate,
    said cathode comprises a cathode catalyst layer and a cathode conductive layer, and
    said fuel cell has a laminated structure in which said porous substrate, said anode conductive layer, said anode catalyst layer, said electrolyte membrane, said cathode catalyst layer, and said cathode conductive layer are joined in this order;
    wherein said separating layer is formed between said porous substrate and said liquid fuel chamber.

13. The fuel cell according to claim 1, wherein one end of said separating layer is formed in contact with an outside of said fuel cell.

\* \* \* \* \*